United States Patent
Mahuli et al.

(10) Patent No.: US 11,163,721 B1
(45) Date of Patent: Nov. 2, 2021

(54) SNAPSHOT CHANGE LIST AND FILE SYSTEM INDEXING

(71) Applicant: EMC IP Holding Company LLC, Hopkinton, MA (US)

(72) Inventors: Harsha Mahuli, Sammamish, WA (US); Dan Knudson, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1049 days.

(21) Appl. No.: 15/496,515

(22) Filed: Apr. 25, 2017

(51) Int. Cl.
  *G06F 16/11* (2019.01)
  *G06F 11/14* (2006.01)
  *G06F 16/16* (2019.01)
  *G06F 16/174* (2019.01)

(52) U.S. Cl.
  CPC ........ *G06F 16/128* (2019.01); *G06F 11/1451* (2013.01); *G06F 16/16* (2019.01); *G06F 16/1748* (2019.01); *G06F 2201/84* (2013.01)

(58) Field of Classification Search
  CPC ..... G06F 16/128; G06F 16/16; G06F 16/1748
  USPC ........................................................ 707/639
  See application file for complete search history.

(56) References Cited

U.S. PATENT DOCUMENTS

| | | | |
|---|---|---|---|
| 8,856,927 B1 * | 10/2014 | Beloussov | G06F 21/53 726/23 |
| 9,015,123 B1 * | 4/2015 | Mathew | G06F 16/178 707/646 |
| 10,474,631 B2 * | 11/2019 | Beaverson | G06F 16/13 |
| 2006/0161746 A1 * | 7/2006 | Wong | H04L 67/1097 711/162 |
| 2013/0227236 A1 * | 8/2013 | Flynn | G06F 3/061 711/165 |
| 2014/0006354 A1 * | 1/2014 | Parkison | G06F 3/067 707/649 |
| 2014/0006357 A1 * | 1/2014 | Davis | G06F 16/182 707/667 |
| 2014/0006465 A1 * | 1/2014 | Davis | G06F 16/183 707/827 |
| 2014/0007239 A1 * | 1/2014 | Sharpe | G06F 16/137 726/24 |
| 2016/0283498 A1 * | 9/2016 | Beaverson | G06F 16/137 |
| 2017/0177452 A1 * | 6/2017 | Parab | G06F 16/2358 |
| 2017/0286228 A1 * | 10/2017 | Redko | G06F 11/1446 |
| 2018/0137139 A1 * | 5/2018 | Bangalore | G06F 16/172 |

\* cited by examiner

*Primary Examiner* — Mark E Hershley
(74) *Attorney, Agent, or Firm* — Amin, Turocy & Watson, LLP

(57) ABSTRACT

The described technology is generally directed towards creating snapshot change lists that describe differences between snapshots that capture file system states at different times. Also described is the use of snapshot change lists for updating an index that represents the objects in the file system at a given time. Data services jobs may be run against the index to select files, instead of running the jobs against the actual file system namespace, which is typically far more efficient when dealing with large file system namespaces.

20 Claims, 17 Drawing Sheets

SNAPSHOT CHANGE LIST AND FILE SYSTEM INDEXING

BACKGROUND

A distributed file system is designed to provide storage and client access to a very large number of files, on the order of up to billions of files arranged in a single hierarchical directory structure namespace, for example. As client needs grow, additional storage devices (e.g., file servers) may be added to increase storage capacity, up to some practical limit (e.g., on the order of hundreds of files servers, or nodes).

Part of administering such a large, distributed file system is provided by data services. In general, client administrators or the like run jobs to perform maintenance and other operations such as backup, analytics regarding file system usage and other metrics, and so on. For example, a backup job may be run to back up any files that have been added or changed since the last backup job was run, which is accomplished by checking the change time of each file in the namespace against the last backup time. In this example, the data service's backup policy criterion is whether each file's last change time is more recent than its last backup time.

Such data services jobs are fairly efficient when the number of files is relatively small. However, as the number of files grows, the amount of computing resources and time needed to run a job can become quite large. For example, traversing the file system namespace to select those files that match one or more data services policy criteria can take hours or even days when billions of files need to be evaluated. Further, the large number of metadata evaluations, each followed by some action if an evaluation determines the data services' policy criterion or criteria is met, can adversely impact overall file system performance.

SUMMARY

Briefly, one or more aspects of the technology described herein are directed towards creating, by a system comprising a processor, a first snapshot representing a first state of a file system namespace at a first time and creating, by the system, a second snapshot representing a second state of the file system namespace at a second time. Aspects comprise generating, by the system, a change list representing differences between the second snapshot and the first snapshot and accessing, by the system, an existing instance of an index, the index comprising object identifiers respectively for objects of the file system namespace and specified object attribute datasets respectively associated with the object identifiers. Described herein is updating, by the system, the existing instance of the index into an updated instance of the index, comprising processing information in the change list to at least one of modify one or more of the object identifiers or modify one or more of the specified object attribute datasets.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards creating snapshot change lists that describe differences between snapshots that capture file system states at different times, and their use in generating and thereafter updating (maintaining) an index that represents the objects in the file system at a given time. The index contains sufficient information to run a number of data services jobs to select files relevant to the jobs, thereby avoiding the expensive (in computing resources and time) need to traverse (walk) the actual file system namespace to perform much of a job's operations.

In one or more aspects, the index is kept relatively current with respect to the actual state of the file system. To this end, the index is updated using snapshot technology including generating a change list that represents the differences between two snapshots in time. In general, a snapshot captures the state of a file system at a particular snapshot time, allowing the restoration of any deleted or modified files that took place after each snapshot. Snapshots are highly efficient because they are relative to a previous file system state captured in one or more earlier snapshots, using pointers to previous snapshots' data when data has not changed since the last snapshot, and only maintaining any changed data.

A change list (or changelist in OneFS® terminology) is a data structure (e.g., file) that denotes the changes between any two snapshots. As will be understood, the previous instance of the index is mapped to a previous snapshot, and to update the previous index to an updated instance, a new snapshot is created, a change list generated for the changes between the new snapshot and the previous, and the change list processed to update (add, delete and/or change) index entries.

In one or more implementations, the index is configured as a key-value data store, and for efficient access may be in the form of a B-Tree or the like. The key is the file system object (e.g., file or directory) identifier, such as a logical inode number, or LIN number in OneFS®, and the associated value is a dataset containing values of attributes of the object identified by the key.

It should be understood that any of the examples herein are non-limiting. For instance, some of the examples are based on the OneFS® file system, which in general in one or more implementations comprises a distributed file system with a single file system namespace; however virtually any file system may benefit from the technology described herein. Thus, any of the embodiments, aspects, concepts, structures, functionalities or examples described herein are non-limiting, and the technology may be used in various ways that provide benefits and advantages in computing and file systems in general.

Figure 1:
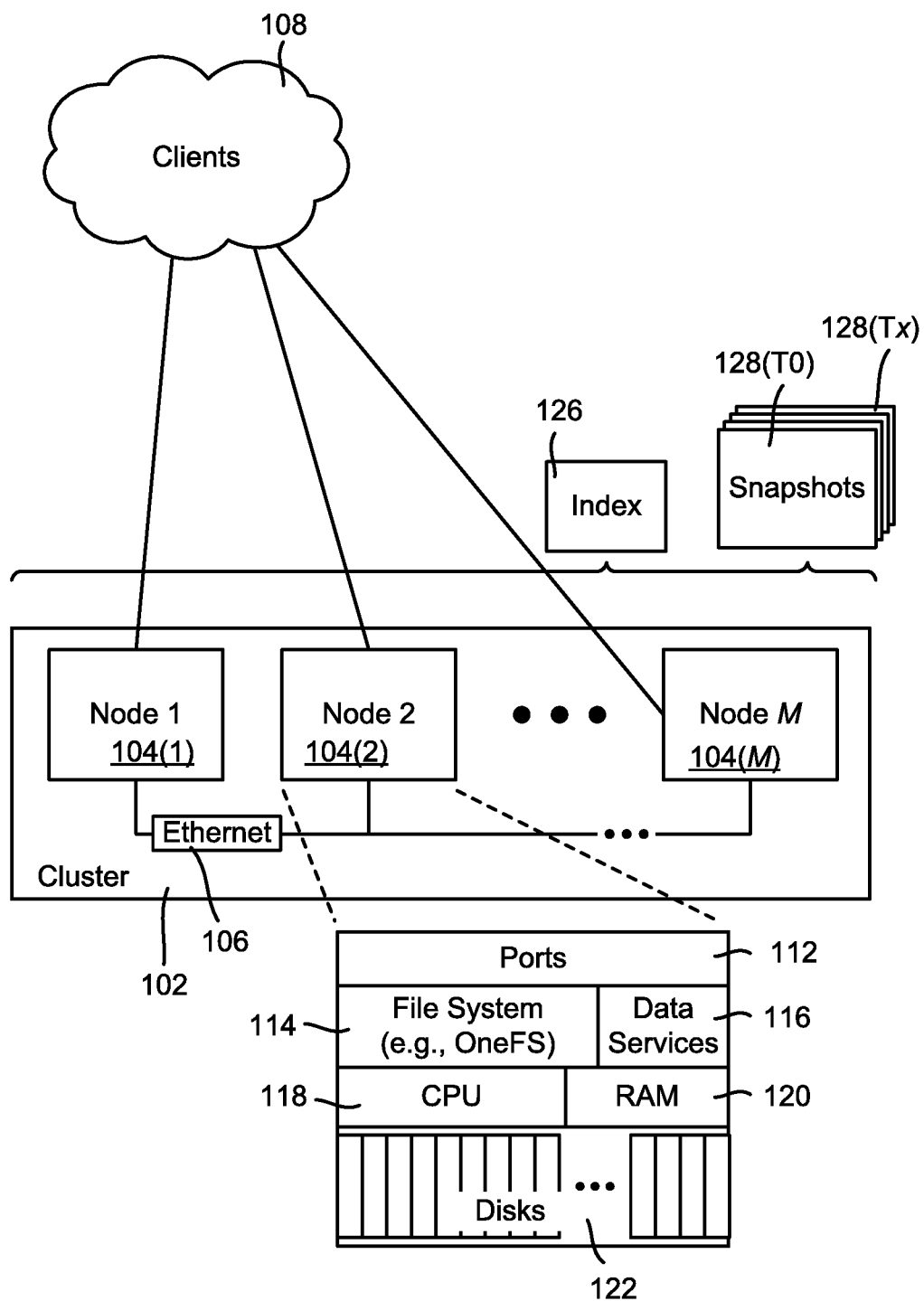
FIG. 1 is an example block diagram representation of a distributed file system including nodes, in which an index contains information regarding the distributed file system's objects, according to one or more example implementations.

FIG. 1 shows a distributed file system such as OneFS® comprising a cluster 102 of nodes 104(1)-104(M), in which each node is typically a server configured primarily to serve files in response to client requests. The nodes 104(1)-104(M) are coupled to each other via a suitable data communications link comprising interfaces and protocols such as represented in FIG. 1 by Ethernet block 106.

Clients 108 make file system-related requests to the cluster 102, which in general is configured as one large file system namespace; there may be on the order of billions of files maintained in a cluster, for example. To this end, a node such as the node 104(2) generally comprises ports 112 by which clients connect to the distributed file system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node includes an instance of the distributed filed system 114 and data services 116. A CPU 118 and RAM 120 are shown for completeness; note that the RAM 120 may comprise at least some non-volatile RAM. The node includes storage devices such as disks 122, comprising hard disk drives and/or solid-state drives. File system I/O (input/output), such as file object reads and writes may be to the local disk or to the disks of one or more other nodes; the physical location or locations of a file system object (directory or file, along with associated metadata) is generally transparent to the client.

One aspect of the technology described herein is generally directed towards an index 126 that maintains information about file system objects in the distributed file system's namespace. As will be understood, once initially generated, the index 126 provides a way to perform any number of data services 116 jobs without needing to traverse the entire distributed file system (cluster) namespace/directory hierarchy. Thereafter, the index 126 is updated (e.g., periodically and/or on some other triggering event) with respect to the current state of the distributed file system namespace in an efficient way that does not require walking the entire distributed file system namespace.

Also shown in FIG. 1 are one or more snapshots 128(T0)-128(Tx). In general, each snapshot maintains information about the state of file system objects in some hierarchical portion (or all) of the distributed file system's namespace at a specific snapshot time, represented by times T0-Tx. As described herein, an aspect of the technology is generally directed towards creating a snapshot change list from any two snapshots that contains information as to what changed between snapshots, with one suitable usage of the snapshot change list being directed towards updating the index into an updated instance of the index as described herein.

Note that the file system namespace may be any (e.g., hierarchical) portion of the entire namespace that an administrator wants to separately administer. This may be the entire namespace comprising the root directory and the files and subdirectories below, as generally used herein in the examples. Alternatively, the namespace may start at some sub-directory of the root directory, in which event the index and various snapshots for that particular namespace do not encompass the entire file system namespace; (it is feasible for there to be a different index and snapshots in time for each different portion of a full file system namespace).

Figure 2:
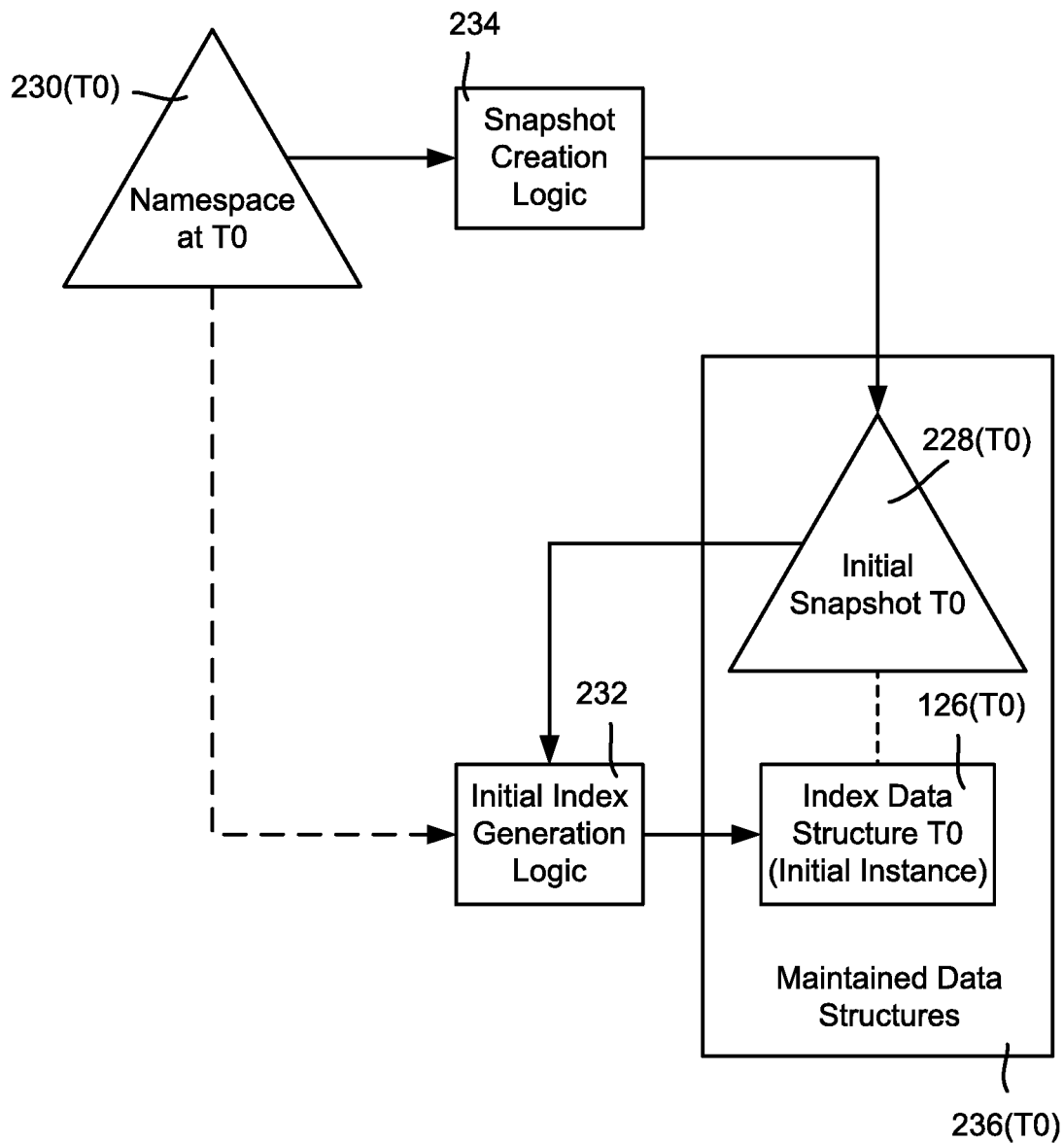
FIG. 2 is an example block diagram representation of creating an initial instance of an index data structure, according to one or more example implementations.
Figure 3:
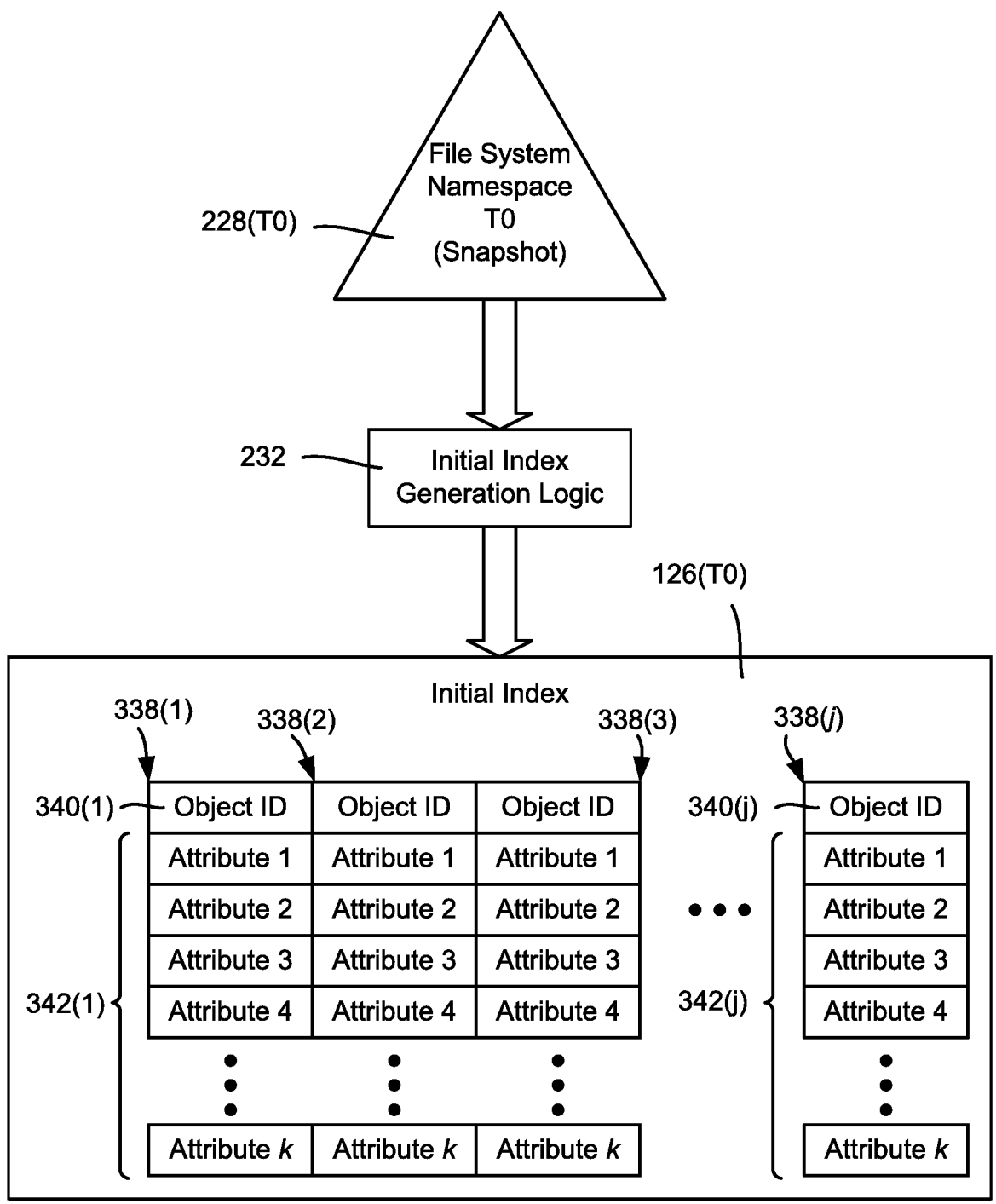
FIG. 3 is an example representation of information in an example index instance, according to one or more example implementations.

To generate an initial instance of the index 126, shown in FIG. 2 as the index data structure (initial instance) 126(0), initial index generation logic 232 basically traverses (walks) an initial state (at time T0) of the file system namespace 230(T0) as generally represented in FIGS. 2 and 3. Note that because in general it is desirable for the distributed file system to remain available to client users and thus the actual current namespace may be dynamically changing during the initial index generation process, instead of holding writes during the traversal, the initial index generation logic 232 may walk the namespace via a snapshot 228(T0) (fixed in time) of the initial namespace 230(T0); (note that namespaces and snapshots are represented as triangles to signify that they correspond to hierarchically arranged data). This is shown as the initial snapshot 228(T0) being created at time T0 by snapshot creation logic 234. This initial traversal may be resource-intensive and time consuming, particularly for an already-existing namespace that has a large number of files, because each object (directory and file) in the namespace needs to be indexed. However as described herein, the initial index generation only needs to be done once (in typical scenarios), as thereafter the index is updated fairly regularly in a relatively efficient update operation.

Once the initial instance of the index data structure 126(T0) is ready, the index data structure 126(T0) (or more concisely the index 126(T0)) is maintained in association with (mapped to) the initial snapshot 232(T0). The index 126(T0) and the initial snapshot 232(T0) are represented in FIG. 1 (with the dashed line between them indicated the mapping relationship) as maintained data structures 236 (T0). Note that the once ready, the initial index 236(T0) may be used at needed, e.g., as a resource accessed for running a data services job. Further note that the initial index generation itself may be a data services job, as may updating the index.

For purposes of index updating, the initial snapshot 232 (T0) only needs to be maintained until the next update to the index is performed, as described herein. While it is feasible to maintain older instances of snapshots (as is known for external user/administrator purposes such as file recovery), typically the use of snapshots for index generation and update is done as an internal data services function, which may be generally transparent to end users including administrators of the distributed file system.

FIG. 3 shows some example details of the initial instance of the index 126(T0). In one of more implementations, each index instance (including the initial instance of the index 126(T0)) comprises a key-value data store of key-value entries, in which each key is an identifier (object ID) of a file system object in the namespace, and the value comprises a dataset of associated object attributes (metadata) of the object corresponding to that identifier. Thus, represented in FIG. 3 is a plurality of key-value entries 338(1)-338(j), with respective object identifiers 340(1)-340(j) and attribute datasets 342(1)-342(j). The attributes in the dataset need not be a copy of every item of metadata of each object, but rather only those needed for relevant operations, such as for evaluation against selection criteria of data service jobs. Note that in a OneFS® environment, a suitable object identifier is the LIN number (logical inode number) that already uniquely identifies each file system directory or file in the cluster namespace.

Figure 4:
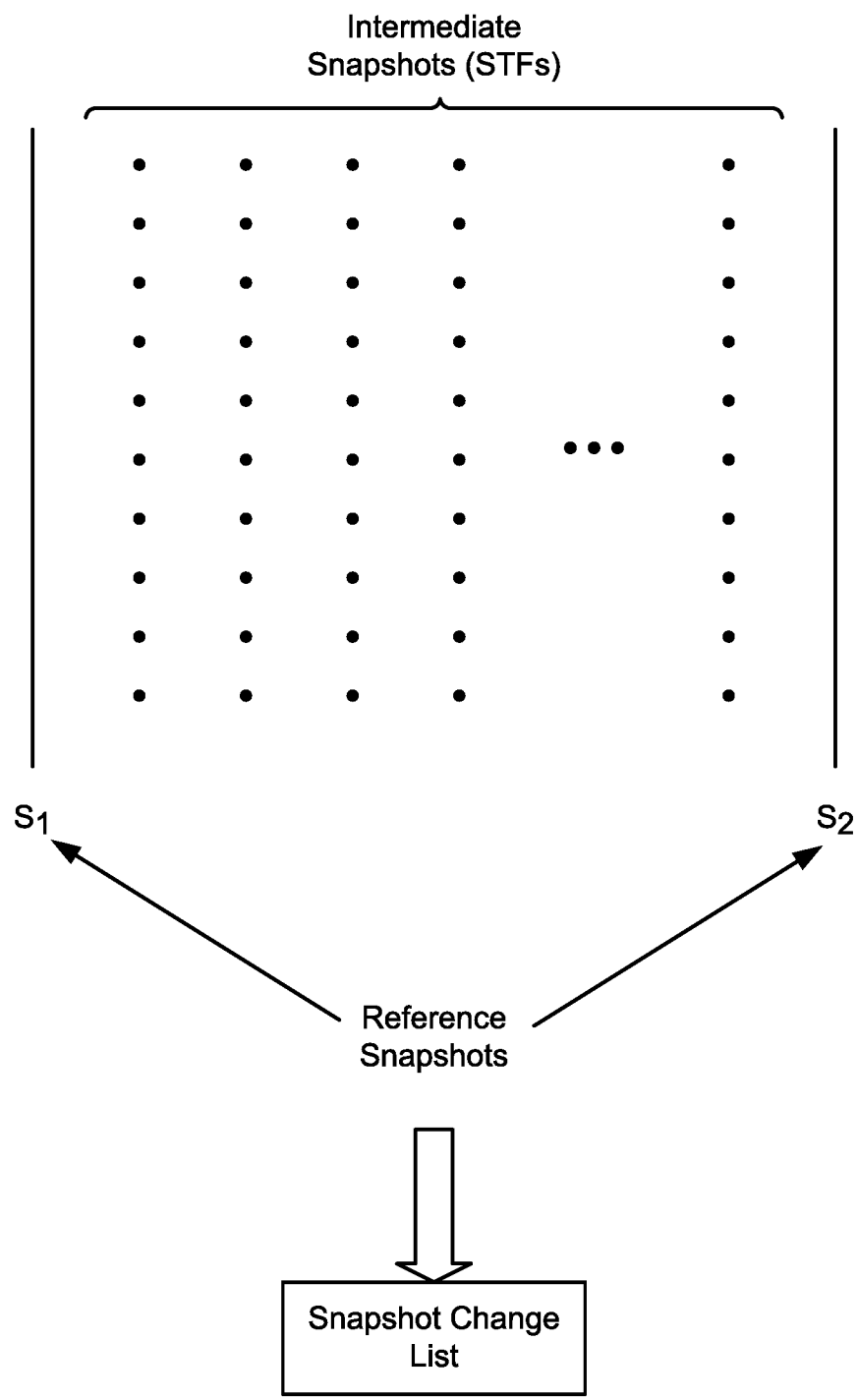
FIG. 4 is an example representation of how reference snapshots and intermediate snapshots may be used to generate a snapshot change list, according to one or more example implementations FIGS. 5-7 comprise a flow diagram showing example operations exemplified as steps related to creating a snapshot change list, according to one or more example implementations

Turning to snapshot change lists, in general each snapshot comprises an associated snapshot tracking file that has an entry for each file or directory in a namespace that has changed after a snapshot of that namespace was taken. In order to reconstruct data from a particular snapshot, the more recent versions' snapshot tracking files are processed, up to the current version, to find any changes and recreate the point-in-time view of that namespace. Thus, in the example of FIG. 4, two snapshots $S_1$ and $S_2$ of the same namespace may have intermediate snapshot tracking files (STFs), which together describe the changes that occurred between the two snapshots $S_1$ and $S_2$. In one or more implementations, creation of a snapshot change list is a data services job.

Change lists describe the differences between any two snapshots that share a common root directory, and for example, may be identified via a combination of the identifiers of the two snapshots used to create the change list. In one or more implementations, the content of a change list includes logical inode numbers (LIN numbers) of the items that have changed, along with the file type and permissions for each such item, the total size of the item in bytes, the timestamp of when the item was last accessed, the timestamp of when the item's data was last modified and the timestamp of when the item's metadata was last changed. Flags or the like provide further information about a changed item and what kinds of changes were made to the item; e.g., the item was added or moved under the root directory of the snapshots, the item was removed or moved out of the root directory of the snapshots, the path of the item was changed without being removed from the root directory of the snapshot, the item either currently contains or at one time contained alternate data streams, the item is an alternate data stream, or the item has hard links. An absolute path of the specified file or directory is also provided.

Figure 5:
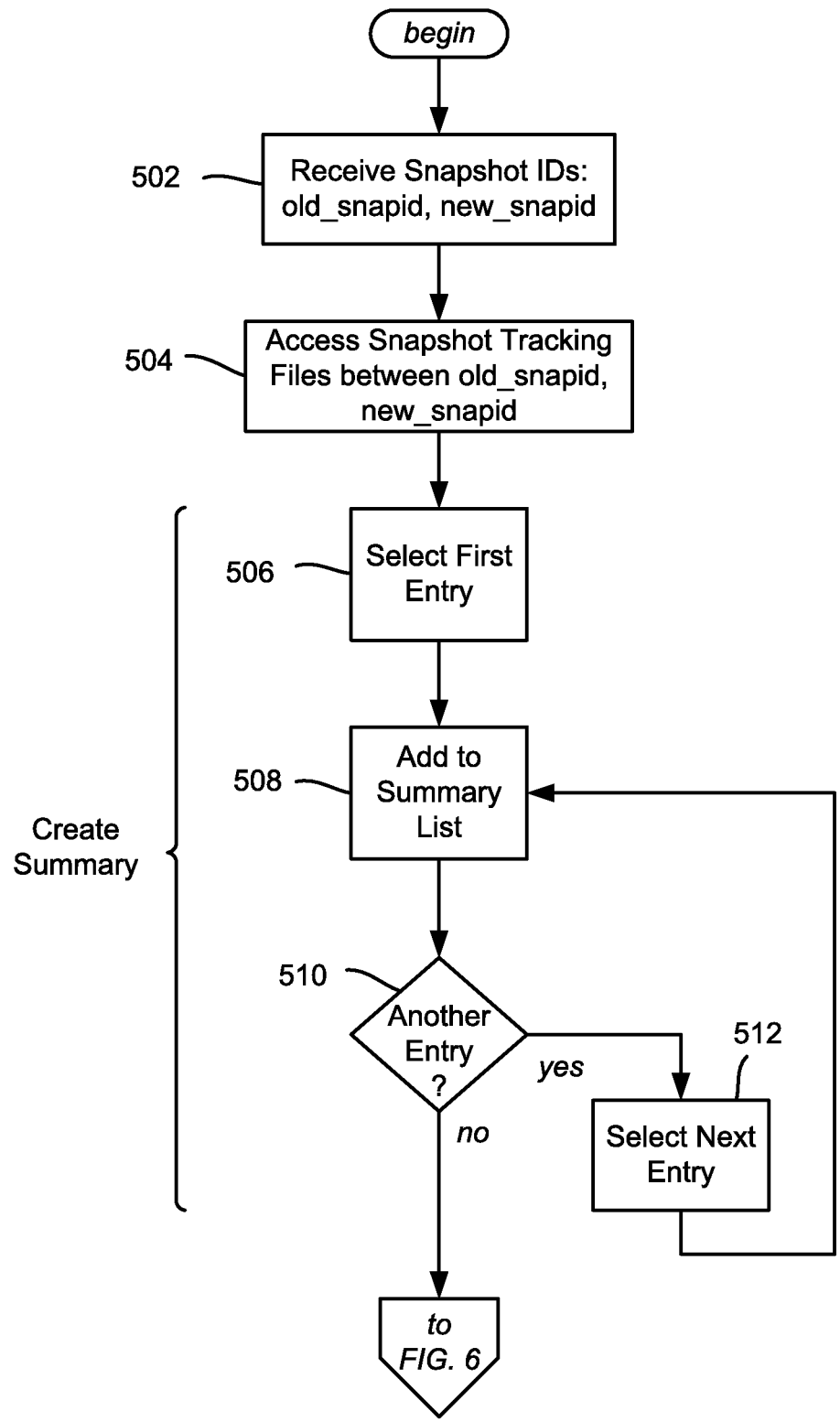
Figure 6:
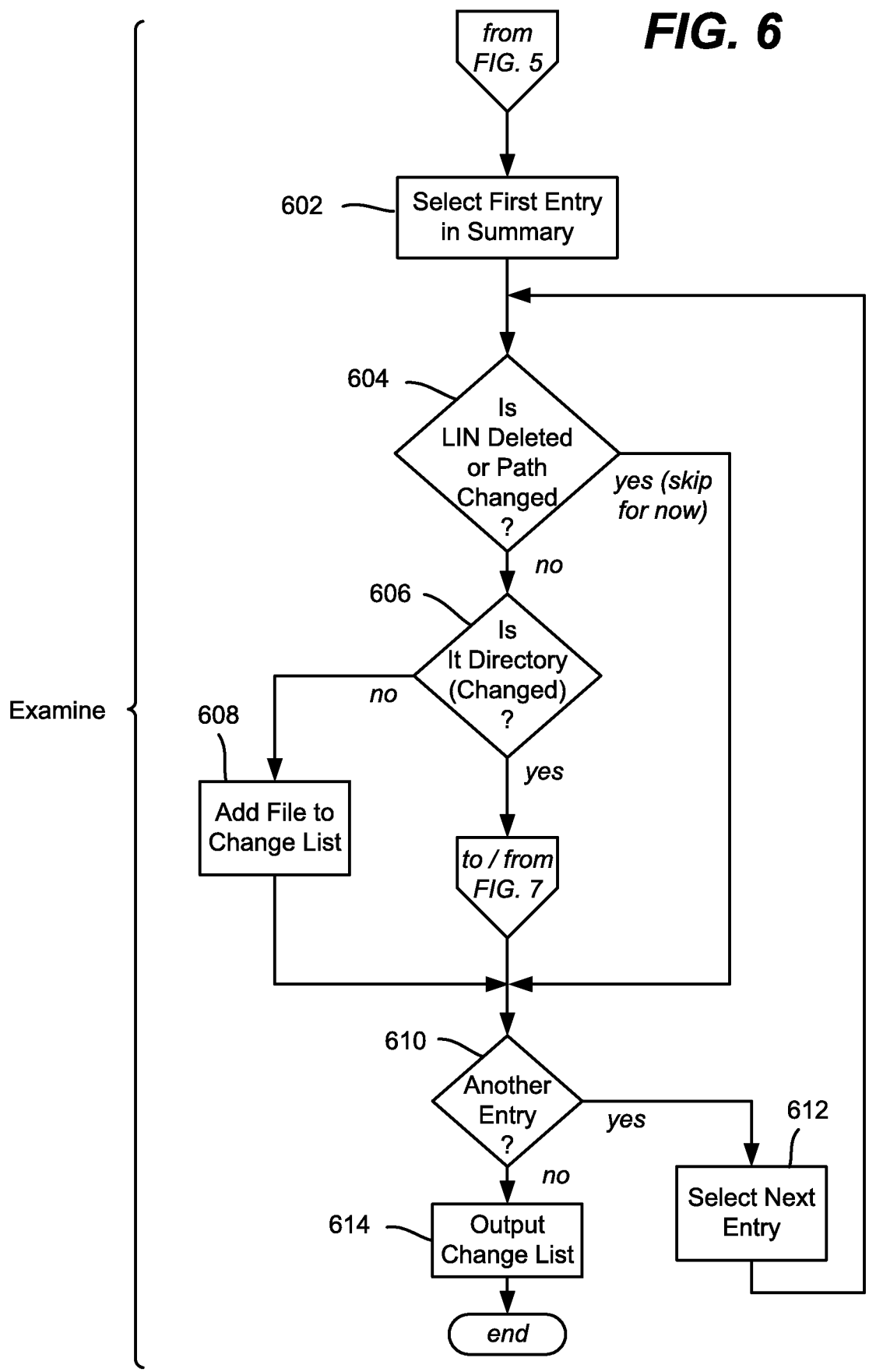
Figure 7:
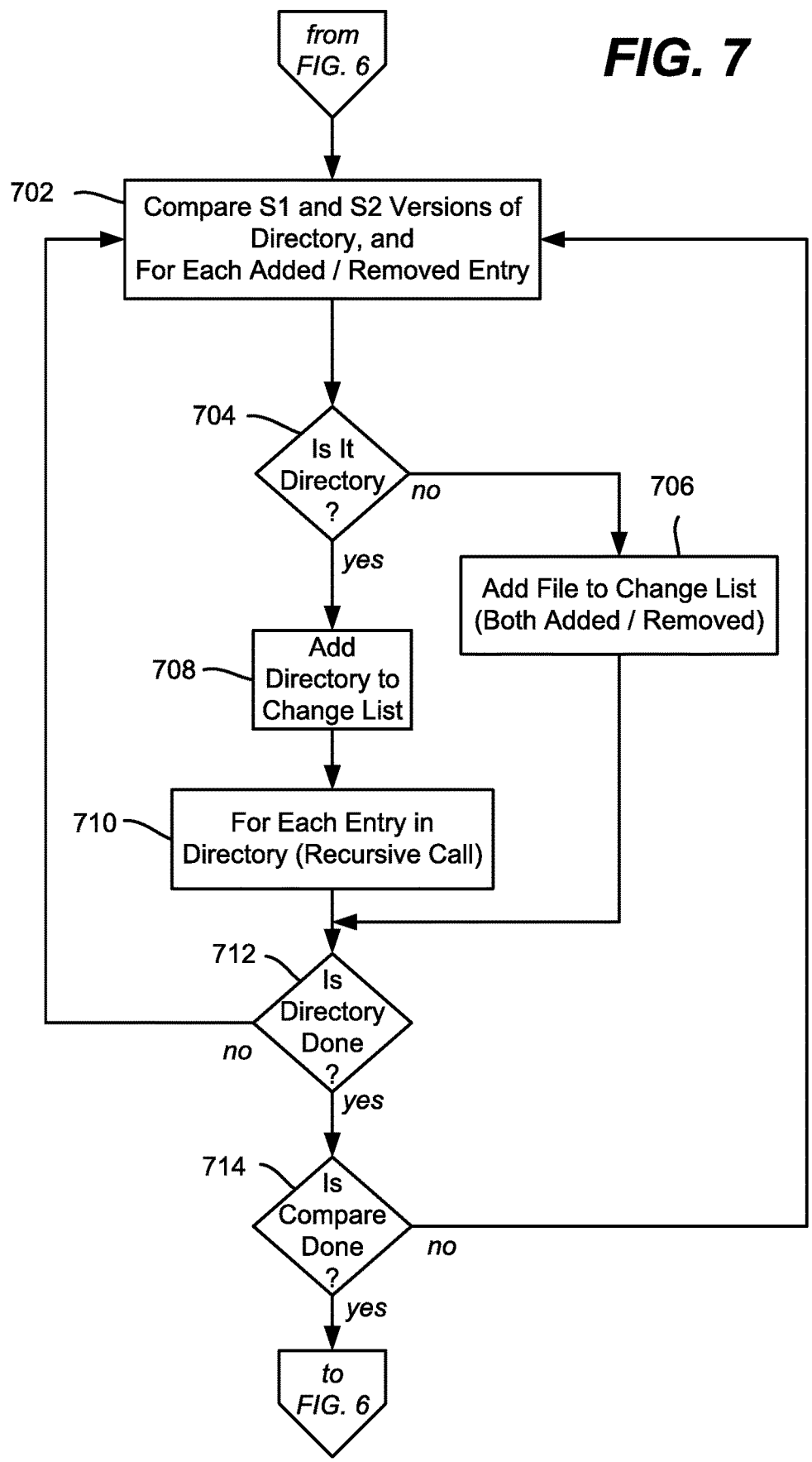
Figure 8:
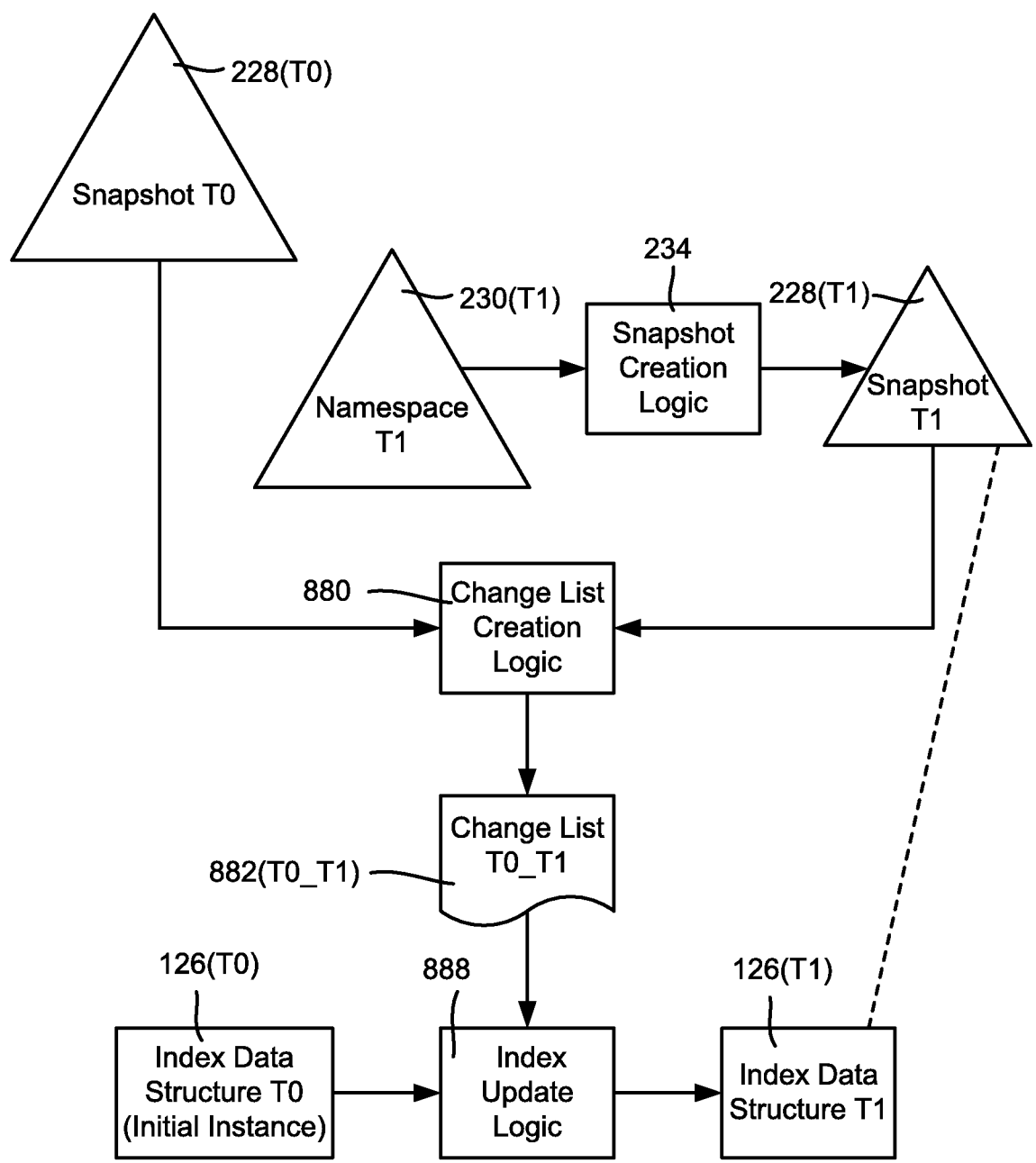
FIG. 8 is an example block diagram representation of updating the initial index instance into an updated index instance, according to one or more example implementations.

FIGS. 5-7 comprise a flow diagram of example logic/operations exemplified as steps for creating a snapshot change list from two snapshots; this logic also represented in FIG. 8 via change list creation logic block 880. In general, given two snapshot identifiers at step 502, (e.g., old_snapid, new_snapid, e.g., $S_1$ and $S_2$, respectively) and accessing the snapshot tracking files in between (step 504) these two identified snapshots, the remaining steps of FIG. 5 create a summary of the entries. Step 506 selects the first entry, and step 508 adds the entry to a summary list. Steps 510 and 512 repeat the adding operations for each other entry until the summary list is built.

Once the summary is built, the example steps of FIG. 6 operate on the summary list, in an examination phase. Step 602 selects the first entry in the summary, and step 604 evaluates the entry for an object identifier (e.g., LIN number in this example) deleted or path changed condition. More particularly, at step 604 if the LIN number does not exist in the old snapshot, it may be ignored; similarly, if the LIN number is removed in the new snapshot or the path was changed between the old and new snapshots, this entry may be ignored for now, because the LIN number will be processed in conjunction with the parent directory during the tree walk. In any such condition, step 604 branches to step 610 to continue the process via step 612 until no entries remain to be processed.

If instead step 604 does not detect any of the above-described conditions, step 606 is executed, which determines whether the object identifier (LIN number) represents a directory that has changed. If so, the operations of FIG. 7 are executed as described below. Otherwise the object is a file, and step 608 adds the file to the change list. Step 610 continues the process via step 612 until no entries remain to be processed.

FIG. 7 represents handling the directory that has changed, beginning at step 702 where the two snapshot versions of the directory are compared. Note that steps 702 and 714 repeat the processing for each added/removed entry.

More particularly, step 704 represents determining whether an entry is a directory. If not step 706 adds the file to the change list, whether the file was added or removed from the directory.

If instead the object is a directory, step 708 adds the directory to the change list. Then, step 710 recursively repeats the processing of the entries of that directory, until step 712 determines that the directory is done. Recursive processing of a directory sets the snapshot change list accordingly. For example, for a new directory added between S1 and S2, S1 is NULL while S2 is valid and the new directory's entries are listed I nthe snapshot change list as added entries; for a directory deleted between S1 and S2, S1 is valid while S2 is NULL and the deleted directory's entries are listed in the snapshot change list as removed entries. For a changed directory, both S1 and S2 are valid. Note that there may be multiple sub-directories under this directory and so on, and thus step 712 tracks each subdirectory separately for each recursive call until the parent directory added at step 708 and any of its subdirectories, including files, have been processed.

When each of the directory entries (step 702) have been processed, step 714 returns to step 610 of FIG. 6. The examination process continues until no entries remain in the summary list, at which time the change list may be "output" at step 614, that is, made available for use, including for use in updating an index.

```
snap_root_lin
old_snapid, new_snapid
main( )
{
   create_summary_stf(old_snapid, new_snapid, &summary_stf)
   foreach (lin in summary_stf)
      visit_changed_lin(lin)
}
visit_changed_lin(lin)
{
   fd = lin_open(lin, old_snapid, . . .)
   fstat(fd, &old_stat)
   get_path(snap_root_lin, lin, old_snapid, &path1)
   if (path1 == NULL)
      // lin doesn't exist in old snapshot - ignore it.
      return
   fd = lin_open(lin, new_snapid, . . .)
   fstat(fd, &new_stat)
   get_path(snap_root_lin, lin, new_snapid, &path2)
   if (path2 == NULL)
      // lin removed in new snapshot - ignore it here because
      // parent directory will process it during tree walk.
      return
   if (strcmp(path1, path2) != 0)
      // lin path changed between old and new snapshots - ignore it here
      // because parent directory will process during tree walk.
      return
   if (S_ISDIR(new_stat.st_mode))
      compare_dirs(lin, path2, COMPARE_CHANGED_DIR)
   add_change_entry(lin, path2, ENTRY_CHANGED)
}
compare_dirs(lin, path, compare_type)
{
   // Open directory or directories required for compare operation.
   snapid = (compare_type == COMPARE_ADDED_DIR ? new_snapid : old_snapid)
   dir1_fd = lin_open(lin, snapid, . . .);
   if (compare_type == COMPARE_CHANGED_DIR)
      dir2_fd = lin_open(lin, new_snapid, . . .)
   else
      dir2_fd = −1
   while (get_dirents_and_cookies(dir1_fd, dir2_fd, . . .)) {
      if (dir2_fd == −1) {
         // Get next unexamined dir1_fd directory entry (dirent).
         dirent = dirent1
         change_type = (compare_type == COMPARE_REMOVED_DIR ?
            ENTRY_REMOVED : ENTRY_ADDED)
      } else {
         // Get next unexamined directory entry (dirent) with smallest cookie.
         if (cookie1 < cookie2) {
            dirent = dirent1
            change_type = ENTRY_REMOVED
         } else if (cookie1 > cookie2) {
            dirent = dirent2
            change_type =ENTRY_ADDED
         } else {
            if (dirents_match(dirent1, dirent2))
               continue
            // The cookies match, but the directory entries (dirents) do not.
            // Examine each directory entry (dirent) in turn, dirent1 first.
            dirent = dirent1
            change_type = ENTRY_ADDED
         }
      }
      visit_changed_entry(dirent, dirpath, change_type)
   }
}
visit_changed_entry(dirent, dirpath, change_type)
{
   create_utf8_path(dirpath, dirent, &path)
   if (dirent->d_type == DT_DIR) {
      compare_type = (change_type == ENTRY_ADDED ?
         COMPARE_ADDED_DIR : COMPARE_REMOVED_DIR)
      compare_dirs(dirent->d_fileno, path, compare_type)
   }
   add_change_entry(dirent->d_fileno, path, change_type)
}
```

Turning to aspects related to using the change list for updating the index, FIG. 8 is an example representation of updating a previous instance of the index into an updated instance of the index. In general, an existing (the previously maintained) instance of the index may be updated into an updated instance of the index at any suitable time, such as every few hours. Any event may be used to update the index, including a time event generated from a schedule or the like. A manual or process-driven event may trigger an update; for example, an administrator may want to run a job using a relatively fresh instance of the index, and thus first schedule or otherwise trigger an index update job manually, or in conjunction with running the job, such as via a script or the like. Note that in general only a current instance of an index is maintained, and updated into a new current instance, however in alternative implementations, a read-only copy of the previously maintained index instance may continue to be maintained and used until no longer needed, such as when any job that was using the previous index instance has finished, and an index update operation based upon that previously maintained index instance has completed.

In general, using some later time T1 in the example of FIG. 8, a more current snapshot 232(T1) is created by the snapshot creation logic for the current state of the namespace 126(T1). This newer snapshot 232(T1), along with the maintained snapshot 232(T0), serve as the basis for updating the index into an updated instance.

To this end, another aspect of the technology described herein is generally directed towards the use of a snapshot change list. As described above, in this example the previous snapshot 232(T0) and the newer snapshot 232(T1) are processed by change list generation logic 880 into a document object or the like comprising a change list 882(T0_T1) that contains the changes, or deltas between the two snapshots 232(T0) and 232(T1). In general, the change list 882(T0_T1) contains a list of new, deleted and modified files, directories and metadata, such as in the form of an object identifier and the type of change denoted in various flags and/or fields.

Once generated, the change list 882(T0_T1) is processed by index update logic 888 to update the initial index 126(T0) into the updated index 126(T1); (FIGS. 15 and 16 describe example operations of the updating of the index). As can be readily appreciated, because only changes in the change list 882(T0_T1) between the namespace states captured in snapshots at different times need to be considered, the update process is typically far more efficient and accordingly faster than the initial walking of the namespace to generate the initial index.

Figure 9:
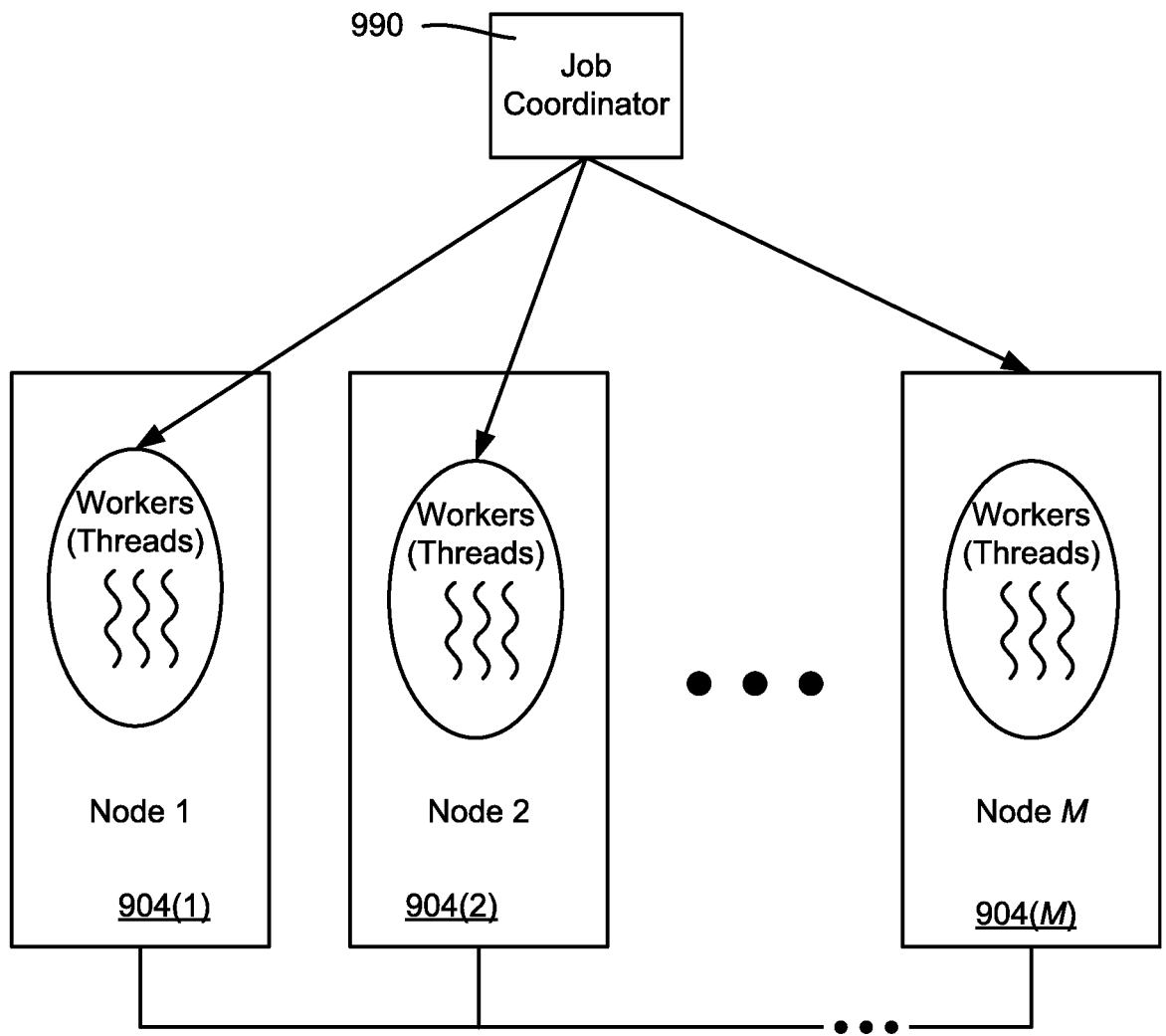
FIG. 9 is an example block diagram representation of a job coordinator using workers to run data services jobs on nodes, including to create snapshot change lists and update indexes, according to one or more example implementations.

FIG. 9 shows the concept of a job coordinator 990 running a job on the nodes, which in this job-operating state are represented as nodes 904(1)-904(M). In one or more implementations, workers (threads) operate within each node in parallel, and in parallel on the nodes in general. Example phases of worker execution include summarize, examine, merge and enumerate.

Figure 10:
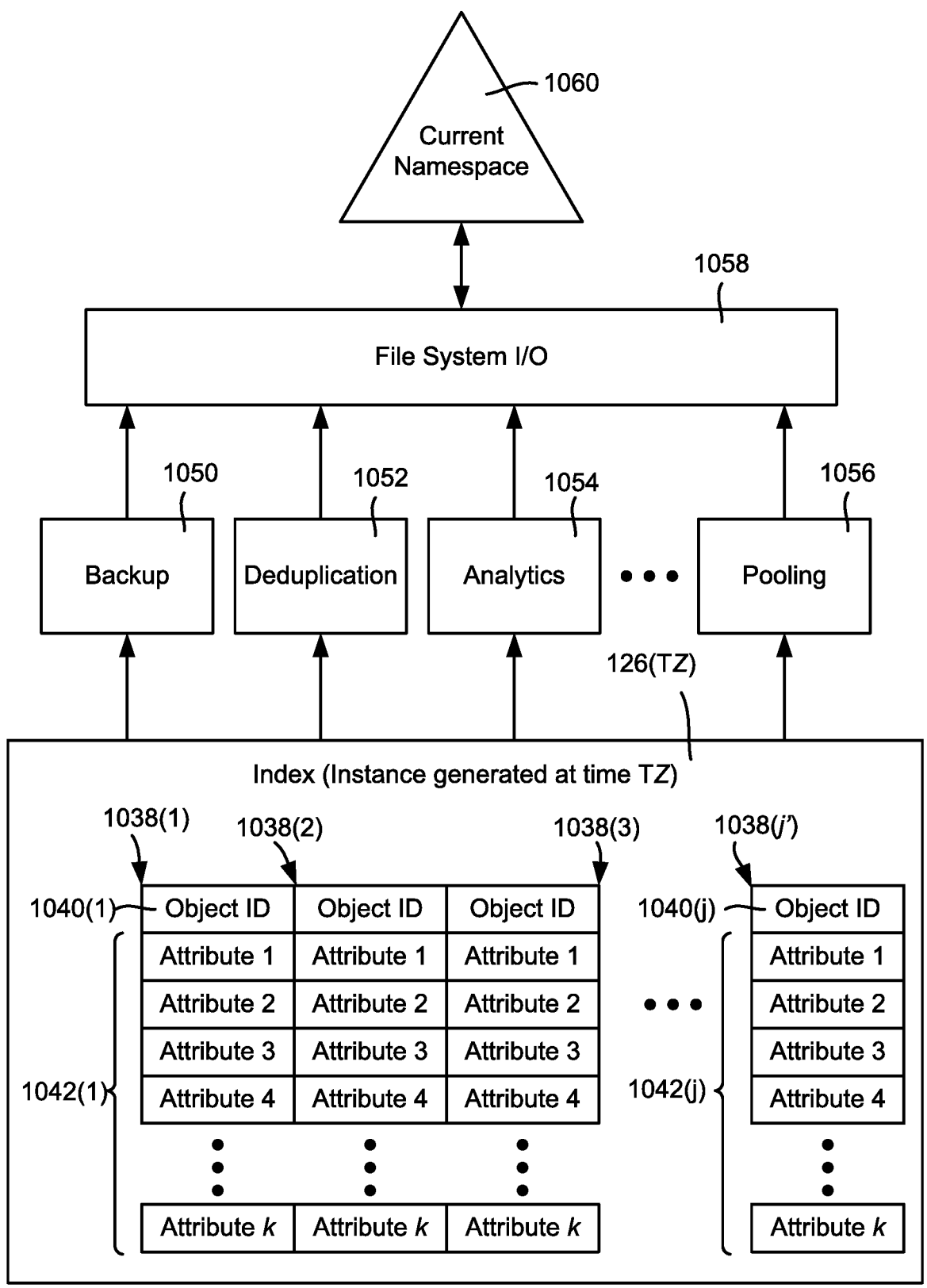
FIG. 10 is an example block diagram representation of data services jobs using information in the index to select file system objects for processing, according to one or more example implementations.

FIG. 10 shows an example representation of data services jobs 1050, 1052,554 and 1056 using an instance of the index 126(TZ) generated at some time TZ. In general, a data services job can use the index 126(TZ) to quickly locate matching candidates for job operations. Example data services jobs shown in FIG. 10 include (but are not limited to) backup, deduplication, analytics and "pooling" jobs.

By way of example, consider that a pooling job 1056 moves certain files to lower-cost (typically slower to access) storage in accordance with an administrator-defined pooling policy. Such files that meet the policy criterion or criteria are typically those that have not been accessed in a while, (but may be files selected based on other policy data, e.g., those files deemed likely to be unrelated to a user's tasks as identified by file extension, such as movies and photos that are stored in employees' directories and are consuming higher-cost storage). Thus, a straightforward example pooling policy may be to locate files that have not been accessed in a week, and move those files to lower-cost storage. The index attribute datasets each may contain a last access timestamp for file objects represented in the index, whereby files that have not been accessed in a week are efficiently located (by their object ID) by evaluating the timestamp against the selection criterion of greater than a week since last access. The use of the index avoids the need to traverse the namespace hierarchy to find those files.

In one or more implementations, the current state of the index may be used by a job to determine whether to run the job or not. For example, a counter or the like that is incremented each time the index is updated may be maintained. A job tracks the last index counter value when the job runs, and before running again, checks the current counter value so as to not run again with the same index state. Instead of a counter, other tracking mechanisms may be used in a similar manner.

Figure 11:
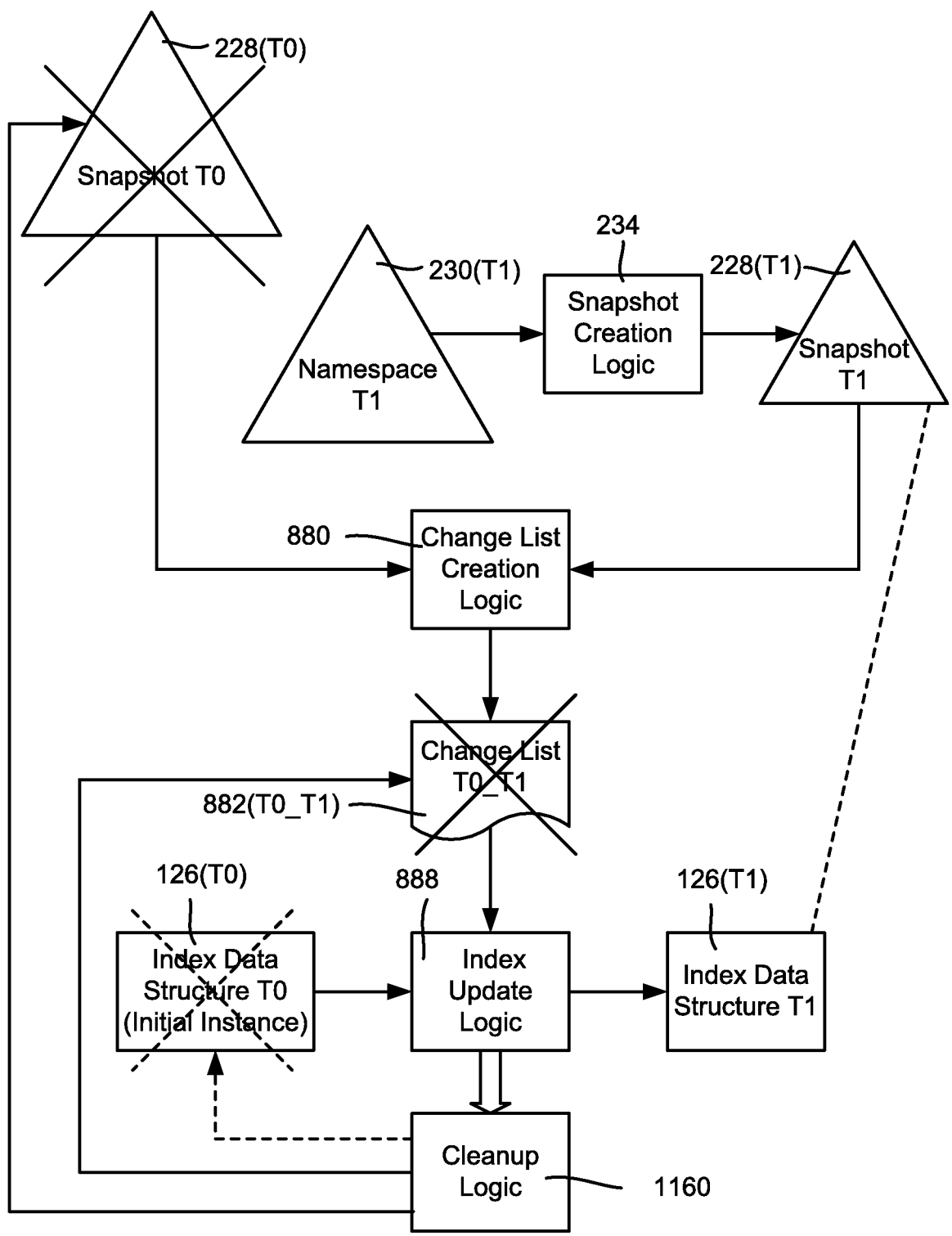
FIG. 11 is an example block diagram representation of cleaning up data structures after updating an index instance, according to one or more example implementations.

Once an index has been updated, the previous resources may be reclaimed. As represented in the example of FIG. 11, once the initial snapshot 232(T0) has been used to generate the change list 882(T0_T1), that snapshot is no longer needed, at least with respect to index updating. Similarly, once the change list 882(T0_T1) has been used to update the index into the updated index 126(T1), the change list 882 (T0_T1) is no longer needed. Once the update is successfully completed, cleanup logic 1160, which may be incorporated into or coupled to the index update logic 888, thus may clean up the initial snapshot 232(T0), in general operating so that the snapshot 232(T1) fully reflects the state of the namespace at time T1. The change list change list 882(T0_T1) may be deleted.

Figure 12:
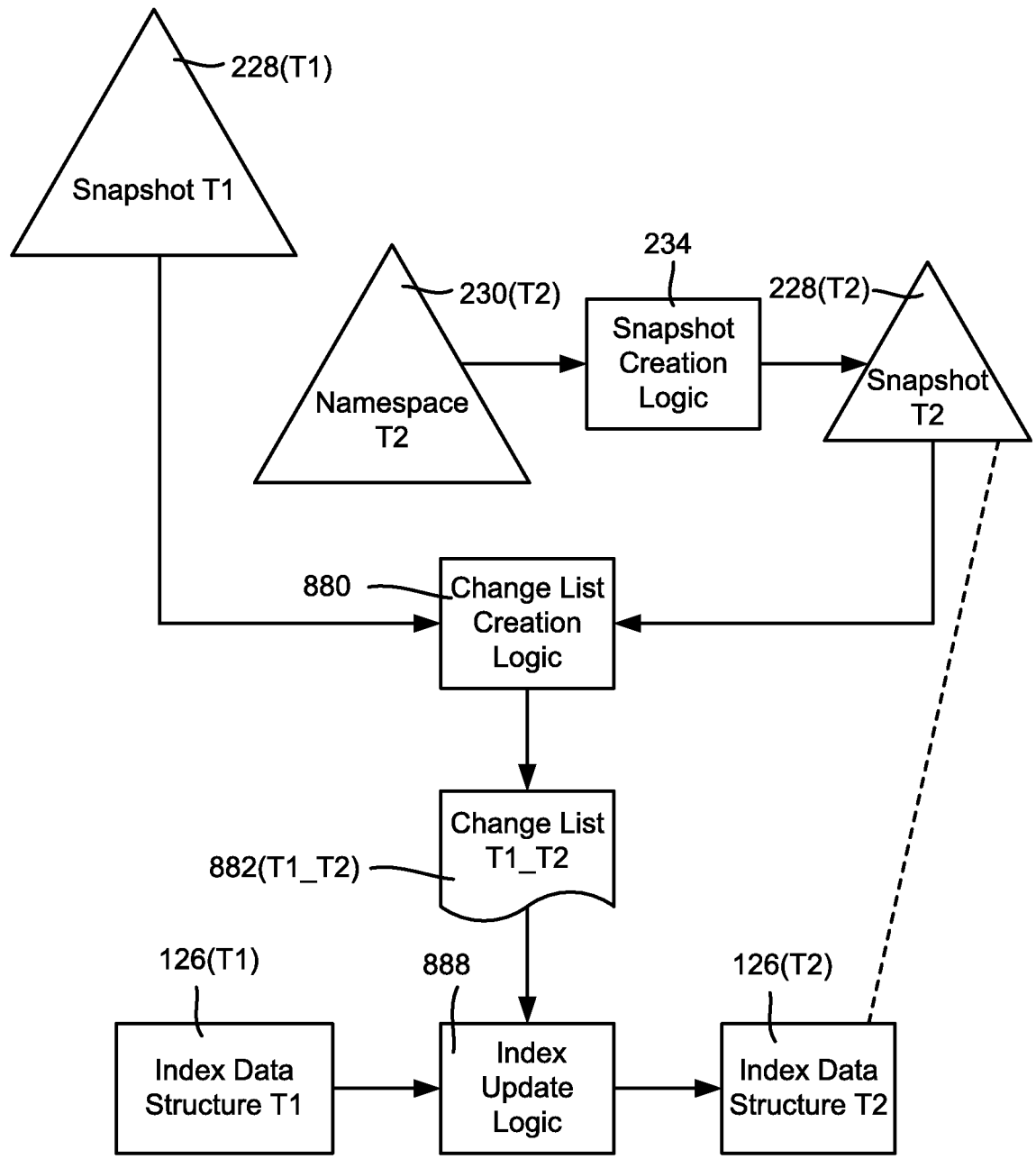
FIG. 12 is an example block diagram representation of updating a previously updated index instance into a newly updated index instance, according to one or more example implementations.

The index updating process continues based upon the most recent index and its mapped-to snapshot, which become the previous structures at the time of the next update. Thus, as exemplified in FIG. 12, a new snapshot 232(T2) of the namespace 230(T2) at time T2, along with the "now-previous" snapshot 232(T1), become the basis for a new change list 882(T1_T2). The change list 882(T1_T2) is then processed to update the now-previous index instance 126(T1) into the updated instance of the index 126(T2). Note that FIG. 12 is generally similar to FIG. 11, except that the starting and ending times are T2 and T1 (FIG. 12) instead of T1 and T0 (FIG. 11).

In one or more implementations, there is only one instance of the index, with priority scheduling used for updating the index, basically as an "update" job that updates the index data structure "in place" based on the change list items. This priority scheduling, along with mechanisms including update status flags (e.g., in progress or completed) and exclusion sets, ensure that a job cannot use an index while the index is being updated, unless the job is one that is able to deal with a dynamically changing index and loose guarantees. Note that some jobs are already configured to deal with dynamic changes in general (e.g., via error handling), such as jobs that previously dealt with a traversal of a dynamically changing namespace; such jobs may be able to deal with a dynamically changing index.

It is also an alternative to maintain a previous, read-only index that is useable by data services jobs while an updated instance of the index is being generated for subsequent jobs.

If so, the previous index 126(T0) may be in use by one or more jobs, whereby the cleanup logic 660 may mark such a previous index 126(T0) for deletion, and use a job-in-use reference counter or some other mechanism to delete the previous index 126(T0) when no jobs remain using that instance of the index. This may be beneficial for time-consuming jobs that would otherwise have to restart any time the index updating operations occurred.

Figure 13:
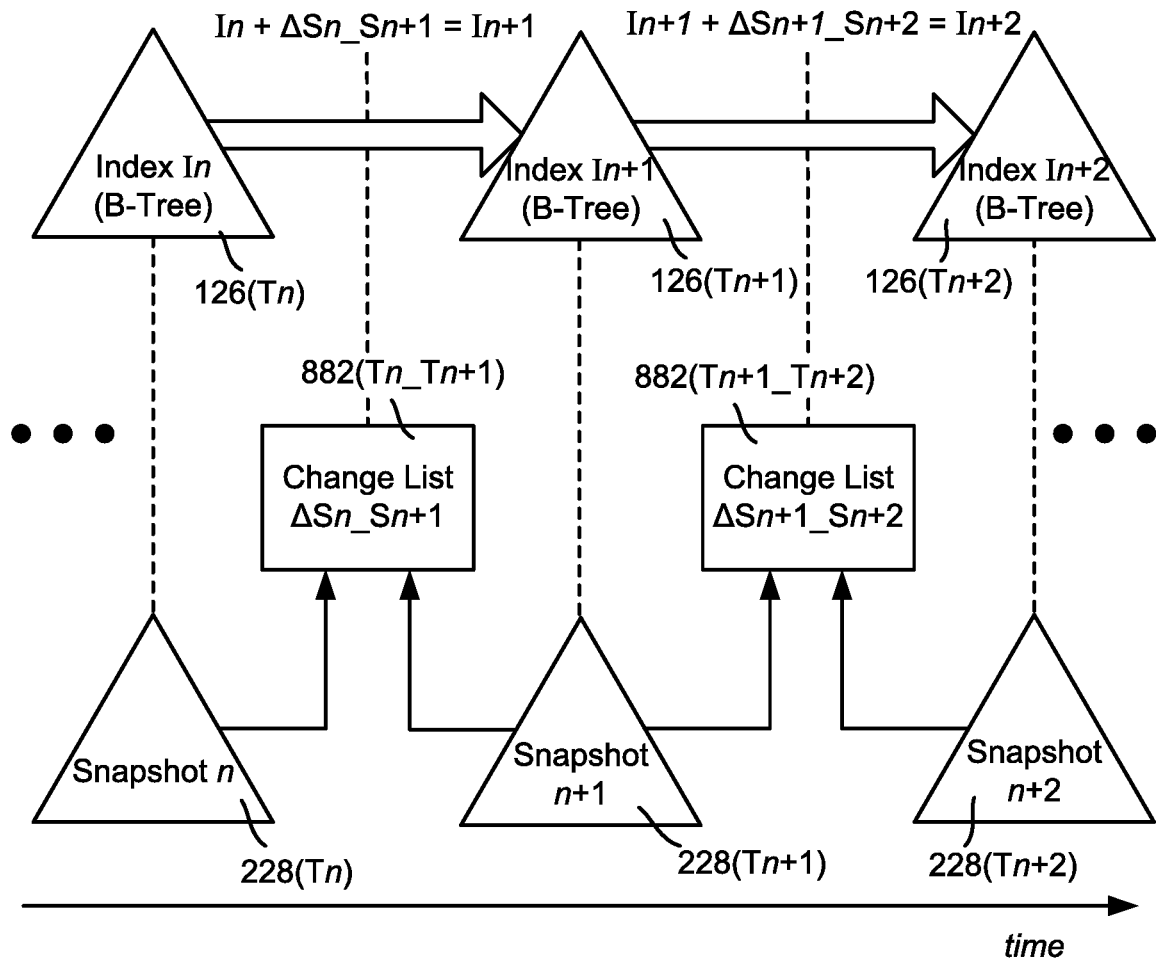
FIG. 13 is an example block diagram representation of how snapshots and snapshot change lists are used to update index instances over time, according to one or more example implementations.

FIG. 13 summarizes the progression of index instances over time as updates take place. Note again that in one or more implementations, there is only one index data structure that is updated into each index instance in time. In FIG. 13, a snapshot 232(Tn) at update (or initial generation) time n is mapped to index instance 126(Tn). At the next update time n+1, a change list 882(Tn_Tn+1) is generated from a next snapshot 232(Tn+1) and the previous snapshot 232(Tn). The change list 882(Tn_Tn+1) is processed to update the previous index instance 126(Tn) into the updated index instance 126(Tn+1). Then at a next update time Tn+2, the index instance 126(Tn+1) is the source for the next index instance, its mapped-to snapshot 232(Tn+1) becomes the previous snapshot, a new snapshot 232(Tn+2) is created and used to generate a new change list 882(Tn+1_Tn+2), which in turn is used to update the index 126(Tn+1) as the source index into the updated index 126(Tn+2), and so on indefinitely.

Figure 14:
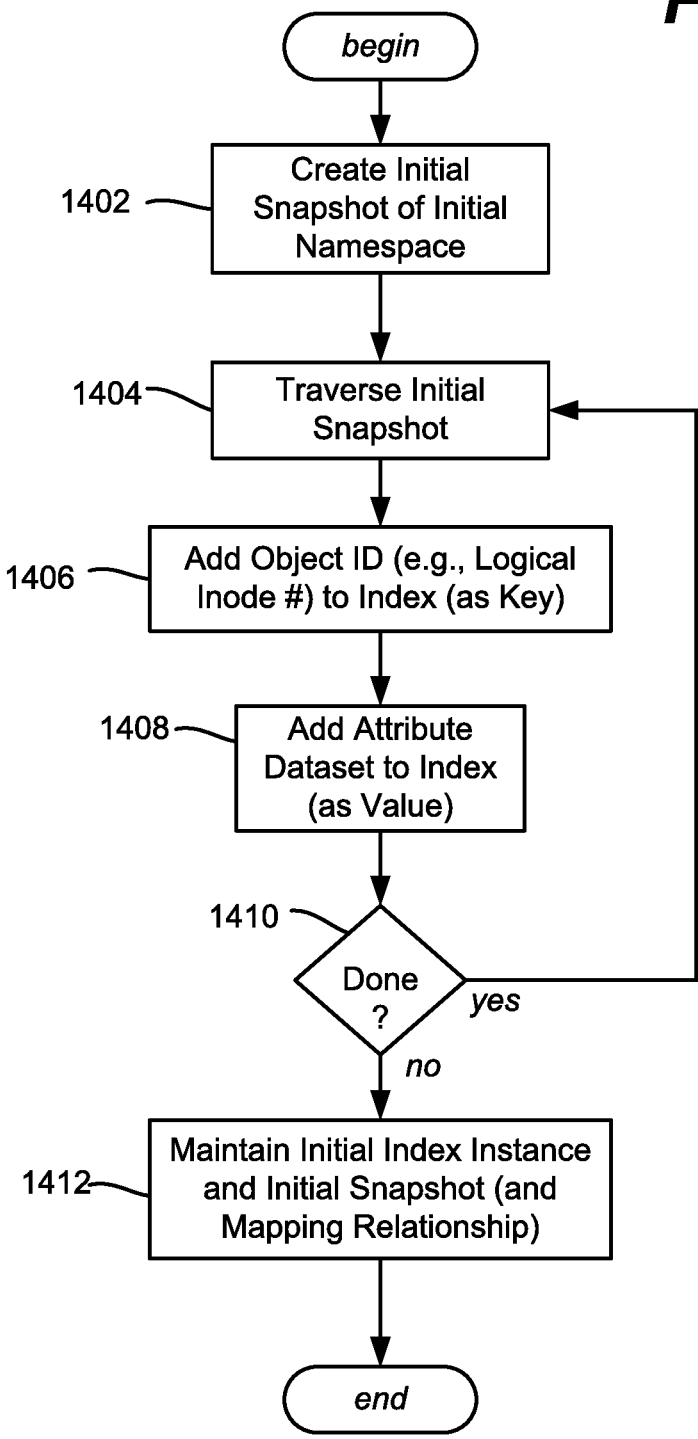
FIG. 14 is a flow diagram showing example steps related to creating an initial index, according to one or more example implementations.

FIG. 14 is a flow diagram generally directed towards operations, exemplified as steps, for generating an initial instance of the index. Step 1402 is an optional step that creates an initial snapshot of the initial namespace. If a snapshot is not traversed, then the file system namespace may be traversed directly.

For each object identifier found that during the traversal, step 1406 adds the object identifier to the index. This may be a logical inode number, and may be used as an index key. Step 1408 adds the attribute data sent to the index, e.g. as a value associated with that key.

Step 1410 repeats the process until the traversal is complete. Step 1412 maintains the initial index instance, the initial snapshot of that instance, and the mapping relationship between them.

Figure 15:
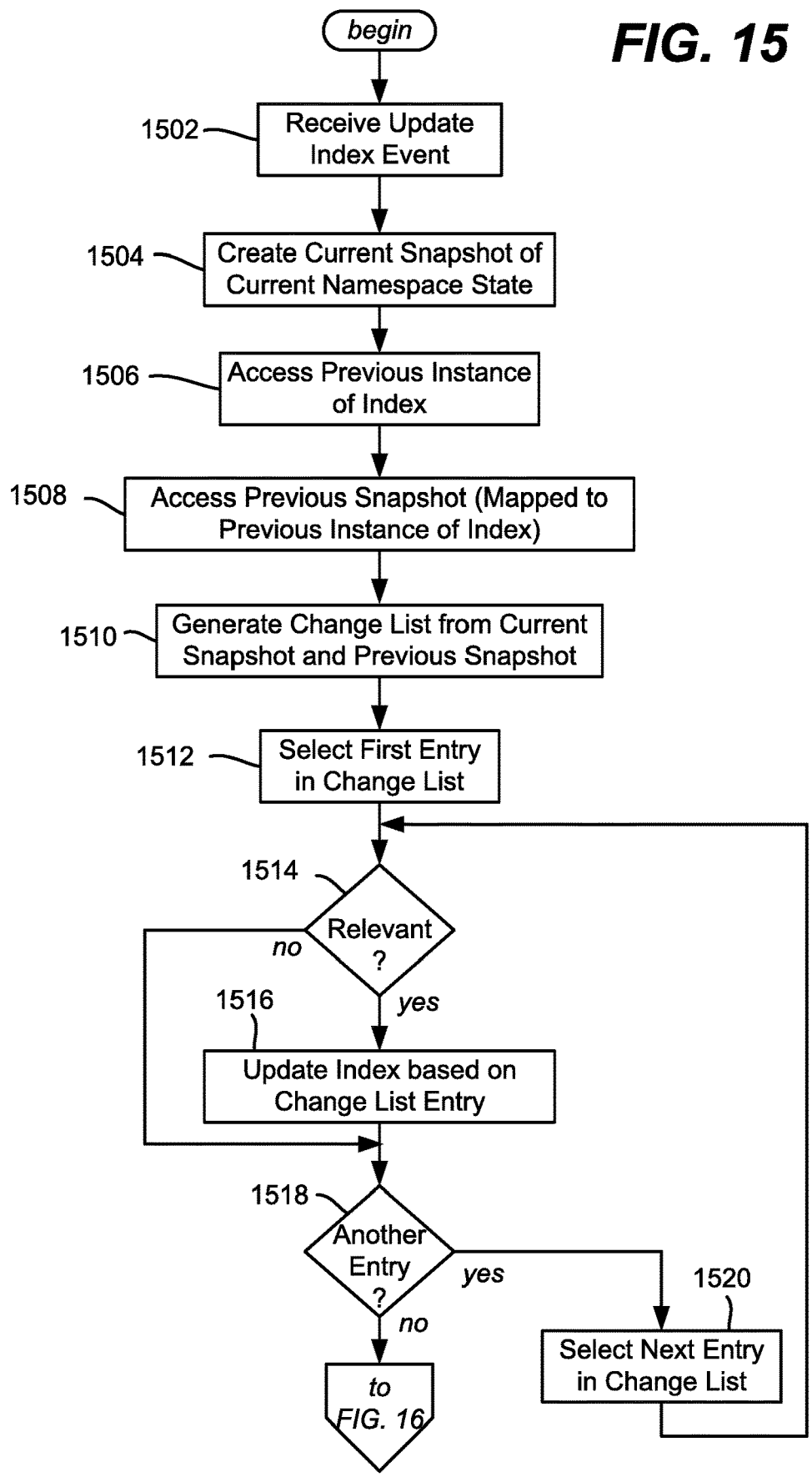
FIGS. 15 and 16 comprise a flow diagram showing example steps related to updating an index, according to one or more example implementations.
Figure 16:
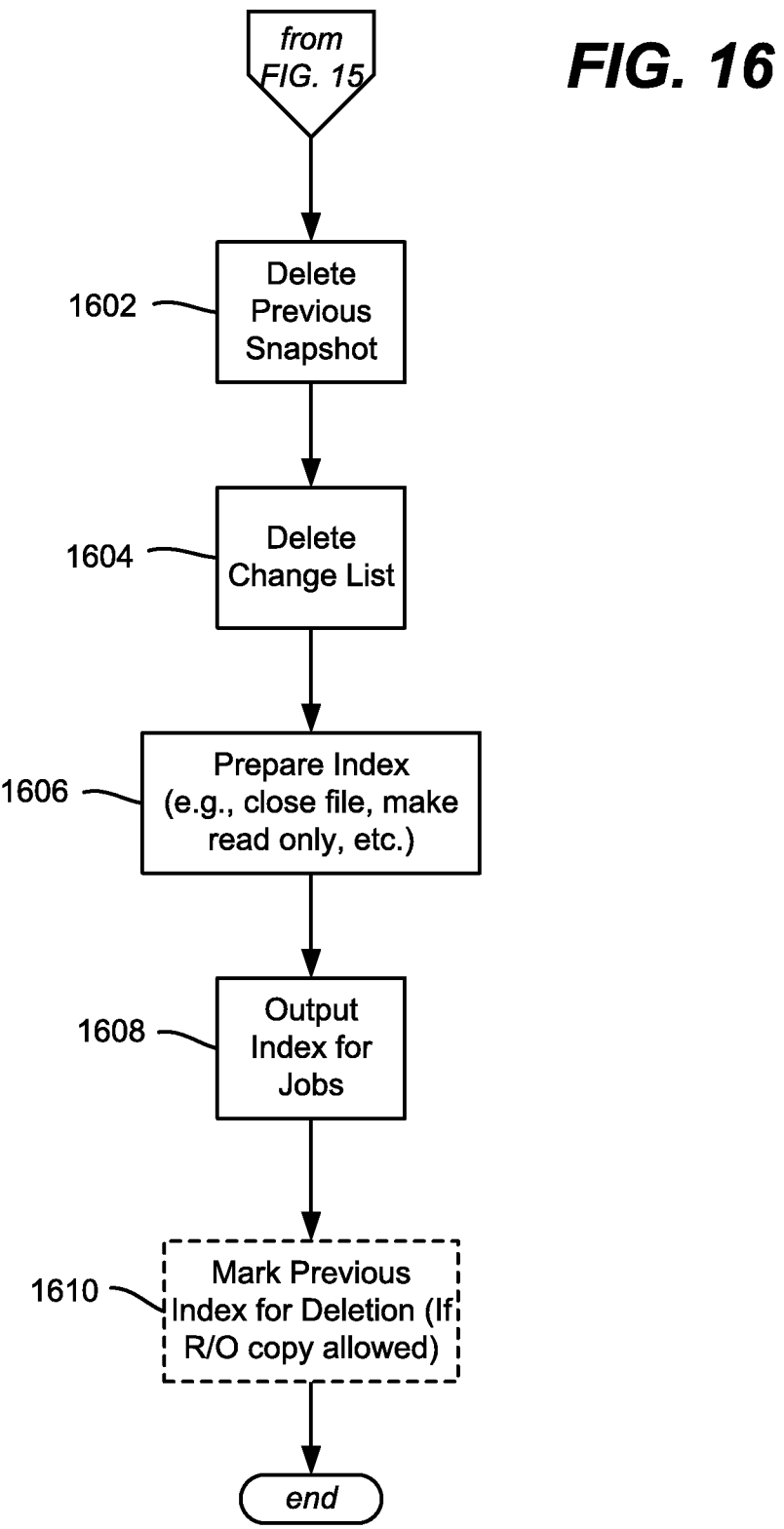

FIGS. 15 and 16 represent updating the index. Step 1502 represents running an update index job, or otherwise receiving some update index event that triggers the process. Step 1504 represents creating a current snapshot of the current namespace state. Step 1506 represents accessing the previous instance of the index, that is, opening or otherwise preparing the data structure for update. This may include setting an update-in-progress flag or the like. Step 1508 represents accessing the previous snapshot, which is mapped to the index in its soon-to-be previous state.

Step 1510 represents generating the change was from the current snapshot and the previous snapshot. Step 1512 selects the first entry (item) in the change list.

If at step 1514 the entry in the change list is one that is relevant to the index, step 1516 updates the index based on the change list entry. Steps 1518 and 1520 repeat the process for each other entry in the change list until none remain.

FIG. 16, steps 1602 and 1604 cleanup operations, including to delete the previous snapshot and the change list. Step 1606 prepares the index for use, e.g. closes the file, possibly makes it read-only, changes the update status flag to indicate complete status, and so on. Step 1608 represents making the index available for jobs if any operations beyond those of step 1606 are needed.

As set forth above, in alternative implementations in which more than one index instance may exist, (e.g. a read-only copy of the previous index instance in use by running jobs), any previous copy may be cleaned up when no longer needed. Step 1610, (represented by a dashed block), represents this alternative implementation marking the previous copy for deletion once no longer needed.

As can be seen, described herein is the creation of snapshot change lists and their use in generating an index that represents a file system namespace. Jobs may be run against the index to more efficiently operate in selecting files that match job policy criteria.

One or more aspects are directed towards creating, by a system comprising a processor, a first snapshot representing a first state of a file system namespace at a first time, creating, by the system, a second snapshot representing a second state of the file system namespace at a second time and generating, by the system, a change data structure representing at least one difference between the second snapshot and the first snapshot. Aspects include accessing, by the system, an existing instance of an index, the index comprising object identifiers respectively for objects of the file system namespace and specified object attribute datasets respectively associated with the object identifiers, and updating, by the system, the existing instance of the index into an updated instance of the index, comprising processing information in the change data structure to at least one of modify one or more of the object identifiers or modify one or more of the specified object attribute datasets.

Described herein is reading at least part of the updated instance of the index to perform a data services job that uses the updated instance of the index to select objects of the file system for processing. Reading at least the part of the updated instance of the index to perform the data services job may comprise performing a backup operation, a pooling operation, a deduplication operation or an analytics operation.

Processing the information in the change data structure to modify the one or more of the object identifiers in the updated instance of the index may comprise adding a new object identifier for a new file object identified in the change data structure to the object identifiers of the updated instance of the index, and adding a specified object attribute dataset associated with the new file object to the specified object attribute datasets of the updated instance of the index. Processing the information in the change data structure to modify one or more of the specified object attribute datasets may comprise modifying one or more of the specified object attribute datasets. Processing the information in the change data structure to modify the one or more of the object identifiers in the updated instance of the index may comprise deleting an object identifier for an existing object identified in the change data structure from the object identifiers of the updated instance of the index, and deleting the specified object attribute dataset associated with the object identifier from the specified object attribute datasets of the updated instance of the index.

Aspects may include generating an initial instance of the index, comprising traversing an initial snapshot of the file system namespace to add the object identifiers for the objects of the file system namespace to the initial instance of the index, and for each object identifier of the object identifiers, to add a specified object attribute dataset of the specified object attribute datasets for attributes of a corresponding object of the file system namespace of the objects of the file system namespace. Also described herein is the capability of deleting the first snapshot and the change data structure.

The change data structure may be a first change data structure and the differences may be first differences; aspects may include creating, by the system, a third snapshot representing a third state of the file system namespace at a third time, creating a second change data structure representing at least one of second differences between the third snapshot and the second snapshot, accessing, by the system, the updated instance of the index, and updating the updated instance of the index into a later instance of the index, comprising processing the information in the change data structure to at least one of further modify one or more of the object identifiers or further modify one or more of the specified object attribute datasets.

One or more aspects are directed towards an index data structure comprising data that represents a file system namespace at a first time, the data comprising, for each object of the file system namespace, an object identifier and an associated attribute dataset corresponding to the object identifier. Described herein is snapshot creation logic configured to create a first snapshot representative of a first state of the file system namespace at the first time and a second snapshot representative of a second state of the file system namespace at a second time, change list generation logic configured to generate a change list comprising information that represents differences between the second snapshot and the first snapshot, and index update logic configured to access the change list to update the index data structure that represents the file system namespace at the first time into an updated index data structure that represents the file system namespace at the second time.

A job engine may read the updated index data structure to perform a data services job. Index generation logic may be configured to traverse an initial snapshot of the file system namespace to generate an initial instance of the index data structure. The file system namespace may comprise a namespace of a multiple file server cluster.

The index data structure may comprise a key-value store, wherein each object identifier comprises a key, and wherein the associated attribute dataset corresponding to the object identifier comprises the value. The index data structure may comprise a B-Tree data structure. The object identifier for each object of the file system namespace may comprise a logical inode number.

An object of the file system namespace may comprise a file object comprising a file object identifier in the updated index data structure, and the associated attribute dataset corresponding to the file object identifier may comprise at least one attribute value from a group of attribute values.

Cleanup logic may be configured to delete the first snapshot and the change list.

One or more aspects are directed towards updating an index of file system object identifiers respectively identifying file system objects and attribute datasets respectively associated with the object identifiers into an updated instance of the index in response to an update event, the updating comprising creating a current snapshot representing a current state of a file system namespace, generating a change list from the current snapshot relative to a previous snapshot created prior to the current snapshot and corresponding to a previous instance of the index, and processing entries in the change list to modify one or more file system object identifiers in the updated instance of the index and modify one or more datasets of the associated attributes. Aspects include running a data services job using the updated instance of the index to access the attribute datasets to locate ones of the file system objects that match one or more specified data service job policy criteria.

The running of the data services job may comprise selecting the ones of the file system objects corresponding to ones of the attribute datasets that at least one of match one or more specified backup policy criteria, that match one or more specified pooling policy criteria, that match one or more specified deduplication policy criteria, or that match one or more specified analytics criteria.

One or more aspects are directed towards accessing, by a system comprising a processor, a first snapshot of a file system namespace corresponding to a first state of the file system namespace at a first time, accessing a second snapshot of the file system namespace corresponding to a second state of the file system namespace at a second time and generating summary data representative of a summary of the first snapshot and the second snapshot. Aspects include processing the summary data to determine one or more changes between first objects identified in the first snapshot and second objects identified in the second snapshot, resulting in change data representative of changed objects, and for each change of the one or more changes in which a changed object of the changed objects corresponds to a file, adding an identifier of the file to a change data structure in association with file change information, and for each change of the one or more changes in which a changed object of the changed objects corresponds to a directory, adding an identifier of the directory to the change data structure in association with directory change information.

Generating the summary data may comprise accessing at least one snapshot tracking file that tracks file system namespaces between the first snapshot and the second snapshot. Other aspects may include using the change data structure to update an index.

The file system namespace may correspond to a number of distributed file system nodes, and generating of the summary data may comprise facilitating an execution of at least one worker process on each node. Generating of the summary data may comprise facilitating the execution of the at least one worker process in a summarize phase, and processing of the summary data may comprise facilitating another execution of the at least one worker process at least in part in an examine phase.

The file system namespace may correspond to a number of distributed file system nodes, and the generating of the summary data may comprise facilitating an execution of worker processes on at least one of the nodes. Generating of the summary data may comprise facilitating the execution of at least some of the worker processes in a summarize phase, and the processing of the summary data may comprise facilitating another execution of at least some of the worker processes at least in part in an examine phase. The processing of the summary data comprises traversing each subdirectory of the file system namespace.

Adding of the identifier of the file to the change data structure may comprise adding a logical inode number associated with the file to the change data structure, and adding of the identifier of the directory to the change data structure may comprise adding a logical inode number associated with the directory to the change data structure.

One or more aspects are directed towards snapshot creation logic configured to capture snapshots of a file system namespace, comprising a first snapshot of the file system namespace corresponding to a first state of the file system namespace at a first time and a second snapshot of the file system namespace corresponding to a second state of the file system namespace at a second time. Change list creation logic is configured to process two snapshots and create a snapshot change list representing changed objects between the two snapshots, including being configured to access the first snapshot and the second snapshot to determine object differences between the first snapshot and the second snapshot, wherein the object differences comprise added objects, deleted objects and modified objects, and wherein the object differences are represented in the snapshot change list as identifiers of the changed objects and associated change data for the changed objects.

The change list creation logic may be further configured to process at least one intermediate snapshot tracking file and the two snapshots to create the snapshot change list. The change list creation logic that processes the two snapshots and create the snapshot change list may process the two snapshots into a summary and process the summary into the snapshot change list.

The associated change data for at least some of the changed objects may comprise file type information, permission information, size information, last accessed timestamp information, content last modified timestamp information, and/or metadata last modified timestamp information. The associated change data for at least one of the changed objects may comprise first information of an object added under a root directory of the snapshots, second information of an object moved under the root directory of the snapshots, third information of an object removed from the root directory of the snapshots, fourth information of an object moved out of the root directory of the snapshots, and/or fifth information of a changed path of an object not removed from the root directory of the snapshot. The associated change data for at least one of the changed objects may comprise first information of an object that currently contains or at one time contained one or more alternate data streams, second information of an object that is an alternate data stream, and/or third information of an object that has hard links.

The change list creation logic identifiers of the changed objects may comprise logical inode numbers.

Update index logic may be configured to access the snapshot change list to update an index.

One or more aspects are directed towards accessing a first snapshot of a file system namespace corresponding to a first state of the namespace at a first time, accessing a second snapshot of a file system namespace corresponding to a second state of the namespace at a second time and accessing at least one intermediate snapshot tracking file that tracks one or more changes between the first snapshot and the second snapshot. Other aspects include processing the first snapshot, the second snapshot and the at least one intermediate snapshot tracking file to determine file system namespace objects that changed between the first snapshot and the second snapshot, and for a change of the changes in which a changed object of the file system namespace objects corresponds to a file, adding an identifier of the file to a snapshot change data structure in association with file change information, and for a change of the changes in which a changed object of the file system namespace objects corresponds to a directory, adding an identifier of the directory to the snapshot change data structure in association with directory change information.

The processing of the first snapshot, the second snapshot and the at least one intermediate snapshot tracking file may comprise building a summary of the first snapshot and second snapshot, and processing the summary to determine one or more changes between first objects of the file system namespace objects identified in the first snapshot and second objects of the file system namespace objects identified in the second snapshot. The change data structure to may be used to run a data services job; for example, it is feasible to access the change data structure to run a backup job that backs up only changed objects.

Example Computing Device

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 17 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 17:
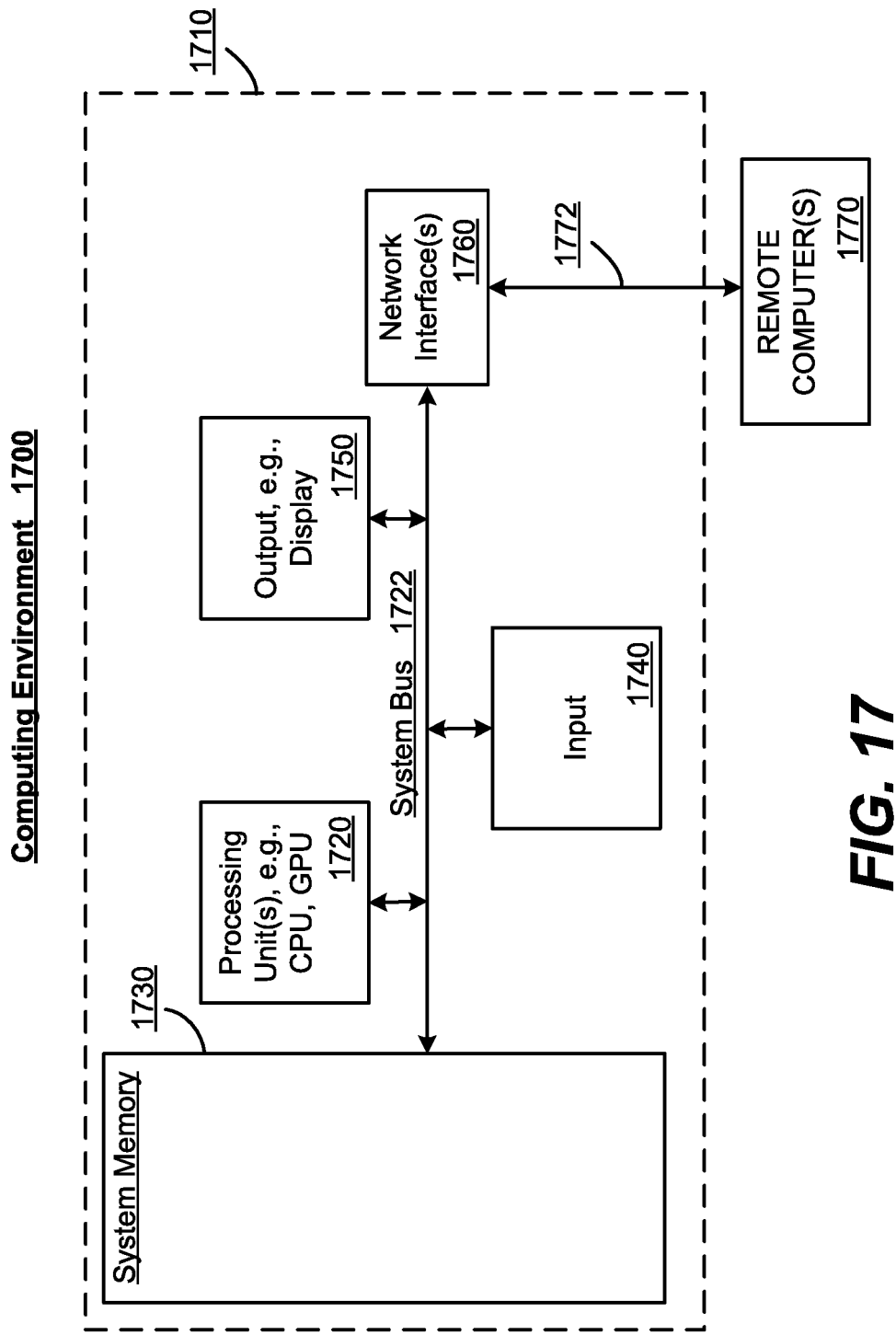
FIG. 17 is a block diagram representing an example computing environment into which aspects of the subject matter described herein may be incorporated.

FIG. 17 thus illustrates an example of a suitable computing system environment 1700 in which one or aspects of the implementations described herein can be implemented, although as made clear above, the computing system environment 1700 is only one example of a suitable computing environment and is not intended to suggest any limitation as to scope of use or functionality. In addition, the computing system environment 1700 is not intended to be interpreted as having any dependency relating to any one or combination of components illustrated in the example computing system environment 1700.

With reference to FIG. 17, an example device for implementing one or more implementations includes a general purpose computing device in the form of a computer 1710. Components of computer 1710 may include, but are not limited to, a processing unit 1720, a system memory 1730, and a system bus 1722 that couples various system components including the system memory to the processing unit 1720.

Computer 1710 typically includes a variety of machine (e.g., computer) readable media and can be any available media that can be accessed by a machine such as the computer 1710. The system memory 1730 may include computer storage media in the form of volatile and/or nonvolatile memory such as read only memory (ROM) and/or random access memory (RAM), and hard drive media, optical storage media, flash media, and so forth. By way of example, and not limitation, system memory 1730 may also include an operating system, application programs, other program modules, and program data.

A user can enter commands and information into the computer 1710 through one or more input devices 1740. A monitor or other type of display device is also connected to the system bus 1722 via an interface, such as output interface 1750. In addition to a monitor, computers can also include other peripheral output devices such as speakers and a printer, which may be connected through output interface 1750.

The computer 1710 may operate in a networked or distributed environment using logical connections to one or more other remote computers, such as remote computer 1770. The remote computer 1770 may be a personal computer, a server, a router, a network PC, a peer device or other common network node, or any other remote media consumption or transmission device, and may include any or all of the elements described above relative to the computer 1710. The logical connections depicted in FIG. 17 include a network 1772, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
 creating, by a system comprising a processor, a first snapshot representing a first state of a file system namespace at a first time;
 creating, by the system, a second snapshot representing a second state of the file system namespace at a second time;
 processing, by the system, a combination of intermediate snapshot tracking files of the first snapshot and the second snapshot to generate summary data;

generating, by the system, a change data structure comprising the summary data representing at least one difference between the second snapshot and the first snapshot, wherein the at least one difference is with respect to at least one of file type information, permission information, size information, last accessed timestamp information, last modified timestamp information associated with content, object linking flag, or last modified timestamp information associated with metadata;

processing, by the system, the summary data to determine change data representative of one or more changes between the changed objects, the changed objects comprising a first object identified in the first snapshot and a second object identified in the second snapshot, wherein for a first set of changes of the one or more changes for which a corresponding first group of the changed objects correspond to a file, adding a file identifier to the change data structure in association with file change information representative of the first set of changes, and wherein for a second set of changes of the one or more changes for which a second group of the changed objects correspond to a directory, adding a directory identifier to the change data structure in association with directory change information representative of the second set of changes;

accessing, by the system, an existing instance of an index, the index comprising object identifiers respectively for objects of the file system namespace and specified object attribute datasets respectively associated with the object identifiers; and updating, by the system, the existing instance of the index into an updated instance of the index, comprising processing information in the change data structure to at least one of modify one or more of the object identifiers or modify one or more of the specified object attribute datasets.

2. The method of claim 1, further comprising, reading, by the system, at least part of the updated instance of the index to perform a data services job that uses the updated instance of the index to select objects of the file system for processing.

3. The method of claim 2, wherein the reading at least part of the updated instance of the index to perform the data services job comprises performing a backup operation, a pooling operation, a deduplication operation or an analytics operation.

4. The method of claim 1, wherein the processing the information in the change data structure to modify the one or more of the object identifiers in the updated instance of the index comprises adding a new object identifier for a new file object identified in the change data structure to the object identifiers of the updated instance of the index, and adding a specified object attribute dataset associated with the new file object to the specified object attribute datasets of the updated instance of the index.

5. The method of claim 1, wherein the processing the information in the change data structure to modify one or more of the specified object attribute datasets comprises modifying one or more of the specified object attribute datasets.

6. The method of claim 1, wherein the processing the information in the change data structure to modify the one or more of the object identifiers in the updated instance of the index comprises deleting an object identifier for an existing object identified in the change data structure from the object identifiers of the updated instance of the index, and deleting the specified object attribute dataset associated with the object identifier from the specified object attribute datasets of the updated instance of the index.

7. The method of claim 1, further comprising, generating, by the system, an initial instance of the index, comprising traversing an initial snapshot of the file system namespace to add the object identifiers for the objects of the file system namespace to the initial instance of the index, and for each object identifier of the object identifiers, to add a specified object attribute dataset of the specified object attribute datasets for attributes of a corresponding object of the file system namespace of the objects of the file system namespace.

8. The method of claim 1, further comprising, deleting, by the system, the first snapshot and the change data structure.

9. The method of claim 1, wherein the change data structure is a first change data structure and wherein the differences are first differences, and further comprising, creating, by the system, a third snapshot representing a third state of the file system namespace at a third time, creating, by the system, a second change data structure representing at least one of second differences between the third snapshot and the second snapshot, accessing, by the system, the updated instance of the index, and updating, by the system, the updated instance of the index into a later instance of the index, comprising processing the information in the change data structure to at least one of further modify one or more of the object identifiers or further modify one or more of the specified object attribute datasets.

10. A system, comprising:

an index data structure comprising data that represents a file system namespace at a first time, the data comprising, for each object of the file system namespace, an object identifier and an associated attribute dataset corresponding to the object identifier;

snapshot creation logic configured to create a first snapshot representative of a first state of the file system namespace at the first time and a second snapshot representative of a second state of the file system namespace at a second time;

change list generation logic configured to generate a change list comprising information that represents differences between the second snapshot and the first snapshot, wherein the change list generation logic is further configured to process a combination of intermediate snapshot tracking files of the first snapshot and the second snapshot to generate the information, wherein the differences are with respect to at least two of file type information, permission information, size information, last accessed timestamp information, last modified timestamp information relating to content, object linking flag, or last modified timestamp information relating to metadata, wherein for a first set of changes of one or more changes for which a corresponding first group of changed objects correspond to a file, a file identifier is added to the change list in association with file change information representative of the first set of changes, and wherein for a second set of changes of the one or more changes for which a second group of the changed objects correspond to a directory, a directory identifier is added to the change list in association with directory change information representative of the second set of changes; and index update logic configured to access the change list to update the index data structure that represents the file system namespace at the first time into an updated index data structure that represents the file system namespace at the second time.

11. The system of claim 10, further comprising a job engine that reads the updated index data structure to perform a data services job.

12. The system of claim 10, further comprising index generation logic configured to traverse an initial snapshot of the file system namespace to generate an initial instance of the index data structure.

13. The system of claim 10, wherein the file system namespace comprises a namespace of a multiple file server cluster.

14. The system of claim 10, wherein the index data structure comprises a key-value store, and wherein each object identifier comprises a key, and wherein the associated attribute dataset corresponding to the object identifier comprises the value.

15. The system of claim 10, wherein the index data structure comprises a B-Tree data structure.

16. The system of claim 10, wherein the object identifier for each object of the file system namespace comprises a logical mode number.

17. The system of claim 10, wherein an object of the file system namespace comprises a file object comprising a file object identifier in the updated index data structure, and wherein the associated attribute dataset corresponding to the file object identifier comprises at least one attribute value from a group of attribute values, wherein the group of attribute values comprises: a change time value, a last access (read) time value, a size value (logical), file and directory name, directory name, ownership data, one or more system attributes, storage pool data and total physical block allocated data.

18. The system of claim 10, further comprising cleanup logic configured to delete the first snapshot and the change list.

19. A non-transitory machine-readable medium, comprising executable instructions that, when executed, facilitate performance of operations, comprising:

updating an index of file system object identifiers respectively identifying file system objects and attribute datasets respectively associated with the object identifiers into an updated instance of the index in response to an update event, the updating comprising:

creating a current snapshot representing a current state of a file system namespace, generating a change list from the current snapshot relative to a previous snapshot created prior to the current snapshot and corresponding to a previous instance of the index, wherein a combination of intermediate snapshot tracking files of the current snapshot and the previous snapshot are processed to generate at least one difference, wherein the change list comprises the at least one difference with respect to file type information, permission information, size information, last accessed timestamp information, content last modified timestamp information, object linking flag, or metadata last modified timestamp information, and processing entries in the change list to modify one or more file system object identifiers in the updated instance of the index and modify one or more datasets of the associated attributes, wherein for a first set of changes of one or more changes for which a corresponding first group of changed objects correspond to a file, adding a file identifier to the change list in association with file change information representative of the first set of changes, and wherein for a second set of changes of the one or more changes for which a second group of the changed objects correspond to a directory, adding a directory identifier to the change list in association with directory change information representative of the second set of changes; and running a data services job using the updated instance of the index to access the attribute datasets to locate ones of the file system objects that match one or more specified data service job policy criteria.

20. The non-transitory machine-readable medium of claim 19, wherein the running of the data services job comprises selecting the ones of the file system objects corresponding to ones of the attribute datasets that at least one of match one or more specified backup policy criteria, that match one or more specified pooling policy criteria, that match one or more specified deduplication policy criteria, or that match one or more specified analytics criteria.

* * * * *